US009446414B2

(12) United States Patent
Morey

(10) Patent No.: US 9,446,414 B2
(45) Date of Patent: Sep. 20, 2016

(54) WASTE PROCESSING MACHINE, VIGILANCE CONTROL SYSTEM, TIMER, AND METHODS THEREFOR

(75) Inventor: Michael D. Morey, Mt. Pleasant, MI (US)

(73) Assignee: BANDIT INDUSTRIES, INC., Remus, MI (US)

(*) Notice: Subject to any disclaimer, the term of this patent is extended or adjusted under 35 U.S.C. 154(b) by 468 days.

(21) Appl. No.: 14/235,072

(22) PCT Filed: Jul. 27, 2012

(86) PCT No.: PCT/US2012/048461
§ 371 (c)(1),
(2), (4) Date: Jan. 26, 2014

(87) PCT Pub. No.: WO2013/016607
PCT Pub. Date: Jan. 31, 2013

(65) Prior Publication Data

US 2014/0163741 A1 Jun. 12, 2014

Related U.S. Application Data

(60) Provisional application No. 61/512,008, filed on Jul. 27, 2011.

(51) Int. Cl.

| | |
|---|---|
| ***G05B 15/00*** | (2006.01) |
| ***G05B 11/01*** | (2006.01) |
| ***G05D 3/12*** | (2006.01) |
| ***H01H 43/00*** | (2006.01) |
| ***B02C 25/00*** | (2006.01) |
| ***B02C 18/22*** | (2006.01) |
| ***B02C 23/02*** | (2006.01) |

(52) U.S. Cl.
CPC ........... *B02C 25/00* (2013.01); *B02C 18/2291* (2013.01); *B02C 23/02* (2013.01)

(58) Field of Classification Search
None
See application file for complete search history.

(56) References Cited

U.S. PATENT DOCUMENTS

| | | | |
|---|---|---|---|
| 3,182,917 A | 5/1965 | Simon et al. | |
| 3,738,178 A * | 6/1973 | Marquis .................. | G04F 3/027 200/38 E |
| 3,819,121 A | 6/1974 | Rogers | |
| 3,938,566 A * | 2/1976 | Penfold ................ | A01G 23/097 144/24.13 |
| 3,974,724 A | 8/1976 | Shadle | |
| 3,989,198 A | 11/1976 | Blasko | |
| 4,260,114 A | 4/1981 | Herder | |
| 4,282,467 A * | 8/1981 | Gruesbeck ............... | G05D 3/18 318/561 |
| 4,346,617 A * | 8/1982 | Schroeder ............... | F16H 59/02 74/481 |
| 4,442,877 A | 4/1984 | Uitermarkt | |
| 5,170,313 A | 12/1992 | Miller et al. | |
| 5,434,457 A | 7/1995 | Josephs et al. | |
| 5,493,191 A * | 2/1996 | Phoy .................. | B60H 1/00835 318/443 |

(Continued)

FOREIGN PATENT DOCUMENTS

| | | |
|---|---|---|
| GB | 2098769 A | 11/1982 |
| WO | WO2010126541 | 11/2010 |

*Primary Examiner* — Adam Lee
(74) *Attorney, Agent, or Firm* — Howard & Howard Attorneys PLLC

(57) ABSTRACT

A control system for a waste processing machine includes an actuator and a timer operatively connected to one another, wherein at least one of the actuator and the timer are in communication with and adapted to control at least one of the feed system, the cutting system, and the power system of the waste processing machine in response to the position of the actuator and a time frame or interval.

57 Claims, 32 Drawing Sheets

(56) References Cited

U.S. PATENT DOCUMENTS

| | | | |
|---|---|---|---|
| 5,497,067 A | 3/1996 | Shaw | |
| 5,552,647 A | 9/1996 | Tinkham | |
| 5,988,539 A | 11/1999 | Morey | |
| 6,000,642 A | 12/1999 | Morey | |
| 6,050,162 A * | 4/2000 | Kalinsky | B23Q 5/048 192/48.8 |
| 6,141,603 A * | 10/2000 | Greenhill | G01L 5/22 318/587 |
| 6,722,596 B1 | 4/2004 | Morey | |
| 6,729,567 B1 | 5/2004 | Morey | |
| 6,814,320 B1 | 11/2004 | Morey et al. | |
| 6,830,204 B1 | 12/2004 | Morey | |
| 6,955,310 B1 | 10/2005 | Morey | |
| 7,011,124 B1 | 3/2006 | Morey | |
| 7,011,258 B2 * | 3/2006 | O'Halloran | A01G 3/002 241/28 |
| 7,040,558 B2 | 5/2006 | Stelter et al. | |
| 7,044,409 B2 | 5/2006 | Stelter et al. | |
| 7,051,864 B1 | 5/2006 | Lin | |
| 7,083,129 B2 | 8/2006 | Beam, III | |
| 7,232,083 B2 | 6/2007 | Stelter et al. | |
| 7,594,620 B2 | 9/2009 | Abramson et al. | |
| 7,637,444 B2 | 12/2009 | Stelter et al. | |
| 8,535,485 B2 * | 9/2013 | Cleminson | C10G 1/00 196/155 |
| 2001/0013525 A1 * | 8/2001 | Ritsche | A61M 15/0065 222/153.04 |
| 2006/0261195 A1 | 11/2006 | Beam, III | |
| 2007/0001038 A1 | 1/2007 | Bouwers et al. | |
| 2007/0034295 A1 | 2/2007 | Chapman | |
| 2007/0257141 A1 | 11/2007 | Stelter et al. | |
| 2007/0267526 A1 | 11/2007 | Uhrich et al. | |
| 2008/0078851 A1 | 4/2008 | Stelter et al. | |
| 2008/0135653 A1 | 6/2008 | Galloway et al. | |
| 2010/0001107 A1 * | 1/2010 | Kallenbach | B02C 18/2283 241/34 |
| 2010/0200088 A1 * | 8/2010 | Marshall | G05B 19/042 137/551 |
| 2012/0060662 A1 * | 3/2012 | Hinshaw | B23D 45/048 83/364 |
| 2012/0255576 A1 * | 10/2012 | Hirooka | B65G 45/10 134/9 |

* cited by examiner

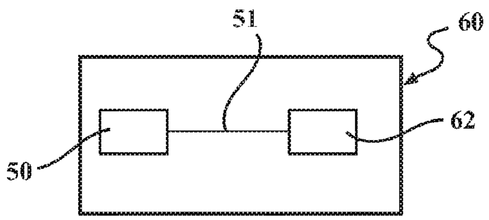
FIG. 4
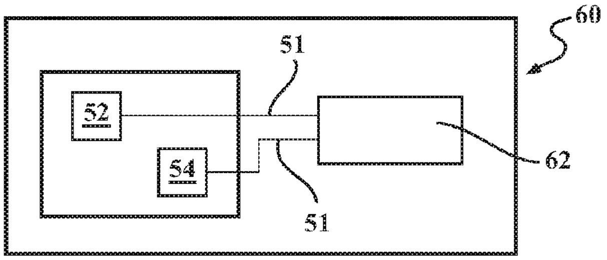
FIG. 5
FIG. 6
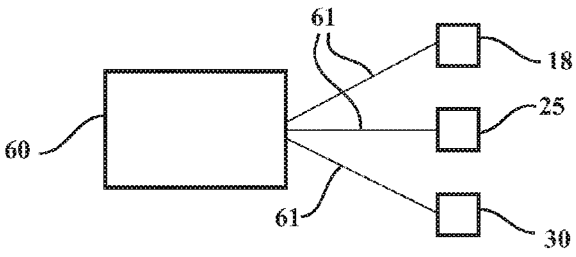
FIG. 7
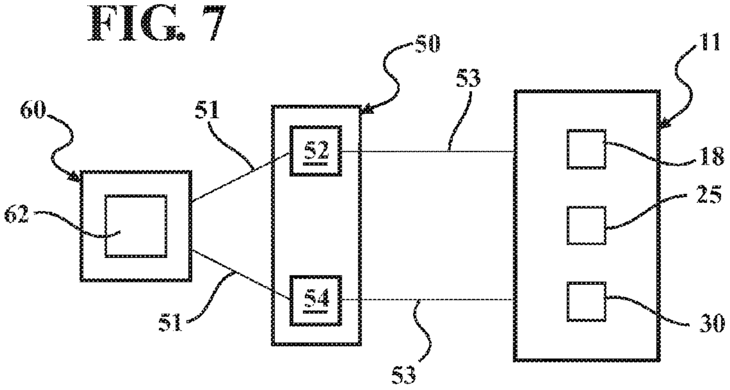
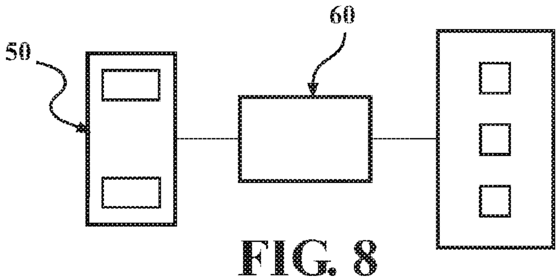
FIG. 8

WASTE PROCESSING MACHINE, VIGILANCE CONTROL SYSTEM, TIMER, AND METHODS THEREFOR

CROSS REFERENCE TO RELATED APPLICATIONS

This application claims the benefit of the filing date of U.S. provisional application Ser. No. 61/512,008 entitled "WASTE PROCESSING MACHINE, VIGILANCE CONTROL SYSTEM, TIMER, AND METHODS THEREFOR" which was filed on Jul. 27, 2011 and which is incorporated herein by reference in its entirety.

BACKGROUND OF THE INVENTION

The present invention relates to waste processing systems, and more specifically to a control device, system, timer, and methods thereof for a waste processing system.

A variety of machines have been developed to recycle, reduce, or otherwise process wood and brush products. Included therein are machines that chip, cut, grind, or otherwise reduce waste (wood) products including, generally, chippers (disk and drum types), hammer mills, hogs, shredders, grinders, and forestry mowers.

These waste processing systems typically include an infeed system and a waste reducing or cutting system, wherein the infeed system is used for directing the waste material to the waste reducing system, the waste reducing system being used for reducing the waste material. These waste processing systems also include a discharge system for removing and directing the reduced material.

These waste processing systems include large, industrial conveyer fed waste processing machines which are capable of quickly reducing bulky (e.g., large size) wood products, as well as doing so in high volume applications. For example, conveyor-fed systems may be used to reduce large tree stumps and trunks, as well as branches, brush, and other bulk wood products. These known systems generally include: an infeed assembly comprising, for example only, a conveyer infeed system; a feed wheel assembly comprising, for example only, a pair of feed-wheels; a cutting assembly comprising, for example only, a drum assembly further comprising reducing members; and a discharge assembly comprising, for example only, a conveyer discharge system.

Examples of such waste processing machines are disclosed in: U.S. Pat. No. 6,047,912, issued Apr. 11, 2000, entitled "Break-Away Processing Tool For A Waste Processing Machine"; U.S. Pat. Nos. 5,863,003 and 6,299,082; issued Jan. 26, 1999 and Oct. 9, 2001, respectively; all to Smith; and entitled "Waste Processing Machine"; U.S. Pat. No. 6,059,210 issued May 9, 2000 to Smith, entitled "Rotor Assembly For A Waste Processing Machine"; U.S. Pat. No. 6,517,020, issued Feb. 11, 2003 to Smith, entitled "Replaceable Raker Assembly For Processing Tool Of Waste Processing Machine"; U.S. Pat. No. 6,299,082, issued Oct. 9, 2001 to Smith, entitled "Waste Processing Machine"; U.S. Pat. Nos. 6,845,931, 7,121,485, 7,384,011, and 7,726,594; issued Jan. 25, 2005, Oct. 17, 2006, Jun. 10, 2008, and Jun. 1, 2010, respectively; all to Smith; and entitled "Multi-Functional Tool Assembly For Processing Tool of Waste Processing Machine"; and U.S. Pat. No. 7,163,166, issued Jan. 16, 2007 to Smith, entitled "Rotatable Assembly For Machines", all of which are incorporated herein by reference in their entirety.

These waste processing systems also include wood chippers. For example, hand-fed wood chippers are used to reduce trees, branches, brush, and other bulk wood products into smaller wood chips. A typical wood chipper includes an infeed chute; a feed system which may be adapted for controlling the feed rate of wood products; a wood chipping mechanism (disc or drum); a drive system for the feed system and chipping mechanism; and a discharge chute. More particularly, the infeed chute is typically a funnel-type conduit provided with a wide opening which tapers toward the feed system to converge the bulk wood/waste products toward the chipping mechanism and, through the action of the feed system, the bulk wood products are brought into contact with the chipping mechanism which grinds, flails, cuts, or otherwise reduces the wood and waste products into smaller pieces. The smaller pieces are then propelled out of the discharge chute. An example of such a wood chipper is disclosed in U.S. Pat. No. 5,988,539, issued Nov. 23, 1999 to Morey, and entitled "Wood Chipper With Infeed Chute Safety Device" which is incorporated herein by reference in its entirety. In these known systems, the wood chipper generally includes an infeed assembly, feed wheel assembly, and a cutting assembly having a rotatable disc or drum with at least one knife or blade for chipping the wood entering the wood chipper and reducing it to wood chips. The chipper also includes a discharge chute for allowing the wood chips to exit the wood chipper, as well as for generally directing them during discharge.

Other examples of such wood chippers are disclosed in U.S. Pat. No. 6,032,707, issued Mar. 7, 2000 to Morey et al., entitled "Drum Assembly For A Wood Chipper"; U.S. Pat. No. 6,036,125, issued Mar. 14, 2000 to Morey et al., entitled "Wood Chipper"; U.S. Pat. No. 5,988,539, issued Nov. 23, 1999 to Morey, entitled "Wood Chipper With Infeed Chute Safety Device"; U.S. Pat. No. 6,000,642, issued Dec. 14, 1999 to Morey, entitled "Wood Chipper With Infeed Chute Safety Device"; U.S. Pat. No. 6,722,596, issued Apr. 20, 2004 to Morey, entitled "Multiple Wheel Feed Wheel Assembly For A Wood Chipper"; U.S. Pat. No. 6,357,684, issued Mar. 19, 2002 to Morey, entitled "Adjustable Tension Feed Wheel Assembly For A Wood Chipper"; U.S. Pat. No. 6,830,204, issued Dec. 14, 2004 to Morey, entitled "Reversing Automatic Feed Wheel Assembly For A Wood Chipper"; U.S. Pat. No. 6,814,320, issued Nov. 9, 2004 to Morey et al., entitled "Reversing Automatic Feed Wheel Assembly For Wood Chipper", all of which are incorporated herein by reference in their entirety.

Further, and by way of example only, the feed wheel assemblies of these waste processing systems, including wood chippers may comprise: a stationary lower feed wheel, connected to a lower housing; and a movable upper feed wheel, connected to an upper housing and movable relative to the lower housing for allowing wood to enter the cutting assembly. Further, one or both of the feed wheels may be rotatably powered or driven. These waste processing and chipper systems are also typically powered via an internal combustion, and again by way of example only: may include one or more hydraulic pumps which supply one or more hydraulic drives or motors for rotating the one or more feed wheels; and may also include one or more drive belts and pulley systems which drive the rotatable disc or drum of the cutting assembly.

Additionally, wood chippers may also generally include a feed control bar for controlling the operation of the various feed systems and may be, for example, mounted above the infeed chute for easy access during the feeding operation. Generally speaking, these control bars are multi-positional bars that control the operation of the feed wheels and may operate, allow operation, or otherwise move the feed wheels:

in a forward direction when in a first position; a reverse direction when in a third position; and a neutral or off state when in a second (e.g., middle) position. It is also typical for these bars to be normally biased to the neutral or off state (e.g., middle position) requiring the operator to manually maintain the control bar in one of the forward or reverse positions, whereby when released the control bar will automatically return to the middle position and the feed wheels will be made, for example, non-operable.

However, although these types of waste processing systems are useful, if operated incorrectly problems can arise and, for example, failure of the operator to follow proper procedures, guidelines, and instructions (e.g., improper usage of the waste processing machine, its various systems, and/or is safety features) may result in damage to the machine or injury. For example, while these feed systems (e.g., feed wheels) are designed to feed bulk wood products to the cutting assembly, such systems are unable to discern what is being fed. Another system that if operated incorrectly can become dangerous is the cutting assembly (e.g., chipping mechanism), with such systems generally designed to rotate at high speeds in order to produce the high torque which is necessary to chip, cut, grind, or otherwise reduce the wood and/or waste products.

As such, various safety features, systems, and methods have been developed in an effort to increase the safety of these waste processing machines. For example, today's waste processing machines include safety features, safety control systems, and/or various controls and shutoff's which are designed to activate, either automatically or manually, when various situations, guidelines, and parameters are encountered or exceeded (e.g., in an emergency situation).

Nonetheless, and due to various circumstances, such safety and control systems may not activate when desired. For example: automatic systems can be overridden or made inoperable by an operator; while manual systems rely on manual (e.g., an operator's) activation, wherein said activation may not arise.

By way of example, the feed control bar/system may be altered (e.g., forced) so that it remains in the forward position rather than automatically returning to the neutral position. This can occur for example when an operator forces the control bar to remain in the forward position (e.g., by tying-off) so that it remains biased to the forward position and thereby defeating the bias that would otherwise move the bar to the neutral position.

Accordingly, a need exists for novel devices, systems, and methods which have, among other advantages: the ability to reduce or prevent the risks associated with these prior art waste processing machines. It is further desirable to provide devices, systems, and methods for waste processing systems that are relatively inexpensive to manufacture, as well as are easily operable. Yet further, a need exists for novel devices, systems, and methods which have, among other advantages, the ability to increase the safety of these systems in a manner that is automatic and/or does not rely on operator intervention. Still further, needs exist for novel devices, systems, and methods which have the ability to increase the utility of these systems. It is also desirable to provide such methods that are effective, cost effective, and are easily maintained and/or followed. It is further desirable to provide systems, practices, and methods which increase safety and otherwise establish or promote the safe operation of these waste processing machines. It is also desirable to provide control, vigilance, timer, and safety devices, systems, and methods for a waste processing system that overcome the above-identified disadvantages.

Therefore, devices, systems and methods that solve the aforementioned disadvantages and having the aforementioned advantages are desired.

SUMMARY OF THE PRESENT INVENTION

The aforementioned drawbacks and disadvantages of these former waste processing devices, systems, and methods have been identified and solutions are set forth herein.

A vigilance control system for a waste processing machine which includes a powered feed system and a powered cutting system is disclosed, wherein the control system comprises a manually operable actuator which is adapted to selectively control (e.g., start/stop) at least one of the feed system and the cutting system, the actuator selectively having at least a first and a second operable position (e.g., at least two operable positions). The control system also includes a timer which is operatively connected to the manually operable actuator, wherein the timer comprises a first state and a second state and is adapted to switch or alternate between the first and second states in response to a first interval having occurred or expired and movement of the actuator. Further, one of the timer and the actuator is in communication with at least one of the feed system, the cutting system, and the power system and is adapted to control the operation thereof (e.g., in response to the first and second states of the timer; or in response to the movement of the actuator; or in response to movement between the first and second operable positions of the actuator). By way of further example, when the actuator is in the second position, at least one of the feed system and the cutting system, is deactivated, and when the actuator is moved from the second position, the timer is set to the first state and remains in the first state until the first interval passes or expires without the actuator being moved. In yet a further example, the timer is set to the first state until one of the first interval passes without the actuator being manually moved, or the actuator is moved. Yet further, operation of at least one of the feed system and the cutting system is modified if the actuator is not manually moved between the operable positions before the first interval expires, or operation of at least one of the feed system and the cutting system is modified if the actuator is not manually cycled between the operable positions before the first interval expires. Further, the cycle between operable positions must occur within a second interval, or the cycle between operable positions must occur within the first interval.

Additional embodiments include: when the first interval passes without the actuator being manually moved, the timer is set to the second state; at least one of the timer and the actuator deactivates at least one of the feed system, the cutting system, and the power system in response to the second state being set; at least one of the timer and the actuator reverses the feed system in response to the second state being set; the timer reverses the feed system in response to the second state being set; at least one of the timer and the actuator deactivates at least one of the feed system, the cutting system, and the power system in response to the movement between at least the first and second operable positions of the actuator; at least one of the timer and the actuator reverses the feed system in response to the movement of the actuator; the timer reverses the feed system in response to the movement of the actuator; and the actuator is adapted to start, stop, and reverse the feed system.

Still further embodiments include: an actuator being a switch; the actuator being a feed control bar; the actuator being biased to remain in the second position; the actuator being adapted to be actuated by an operators foot; the actuator comprising a foot pedal; and the actuator comprising a feed control bar and a foot pedal, each with at least two operable positions. Further, the first interval comprises a preset time interval, or the first interval comprises a user variable time interval.

Additional embodiments include: the actuator being in mechanical communication with the waste processing system; the timer being operatively connected to at least one of the feed system, the cutting system, and the power system and deactivating at least one of the feed system, the cutting system, and the power system in response to the second state being set; the timer being operatively connected to the feed system and deactivating the feed system in response to the second state being set; the timer being operatively connected to the feed system and reverses the feed system in response to the second state being set; the timer being electronic; the interval comprising a preset time; the interval comprising a user settable time; and further comprising a warning indicator to indicate to an operator, before the first interval passes, that the first interval may expire.

Another aspect of the present invention includes a vigilance control system for a waste processing machine which includes a feed system, a cutting system, and a power system adapted to power the feed system and the cutting system, and a manually operable actuator having at least two operable positions and adapted to control at least one of the feed system, the cutting system, and the power system, wherein the vigilance control system comprises a timer for monitoring a time period, wherein the timer is adapted to operatively connect to at least one of the feed system and the cutting system, and is adapted to operatively connect to the actuator and sense movement thereof, wherein in response to the expiration of the time period or the sensed movement of the actuator, the timer is adapted to selectively control at least one of the feed system and the cutting system.

Additional embodiment include: wherein the selective control includes deactivating the feed system in response to the expiration of the time period without sensed movement of the actuator; wherein the actuator includes a first and a second position, wherein further when the actuator is in the second position the feed system is disabled, and when the actuator is in the first position the feed system is enabled and the timer is set to the first state and will remain in the first state until the time period expires without the actuator being manually moved; wherein when the time period expires without the actuator being manually moved, the timer is set to the second state; and wherein the first state is maintained subject to the actuator being moved to the second position and when moved to the second position, the timer is set to the second state.

In another aspect of the present invention, a timer for a waste processing machine which includes a feed system, a cutting system, and a power system adapted to power the feed system and the cutting system, and a manually operable actuator having at least two operable positions and adapted to control at least one of the feed system, the cutting system, and the power system, is disclosed wherein the timer comprises a first state and a second state and is adapted to switch between the first and second states in response to at least one of a time period having occurred and the actuator being moved between the at least two operable positions. The timer is also adapted to operatively connect to at least one of the feed system and the cutting system, whereby the timer is adapted to modify operation of at least one of the feed system and the cutting system if the actuator is not manually moved between the operable positions of the actuator before the time period expires. Further, the timer may be adapted to modify operation of the feed system by deactivating the feed system if the actuator is not manually moved before the time period expires.

And still in another aspect of the present invention, a waste processing machine comprising: a frame; an infeed assembly operatively attached to the frame; a rotatable cutting assembly spaced from said infeed assembly and operatively attached to the frame; at least one feed wheel operatively attached to the frame and disposed between said infeed assembly and said cutting assembly to feed wood material to said cutting assembly; a manually operable actuator adapted to control at least one of the feed system and the cutting system, the actuator having at least two operable positions; a timer operatively connected to the manually operable actuator, adapted to sense positional movement of the actuator, and adapted to determine if positional movement of the actuator has occurred within a preset time frame; wherein at least one of the timer and the actuator is in communication with at least one of the feed system and the cutting system, and is adapted to control the operation thereof; whereby operation of at least one of the feed system and the cutting system is modified if the timer does not sense positional movement of the actuator during the preset time frame.

In yet another embodiment, a waste processing machine comprises: a frame; an infeed assembly operatively attached to the frame; a rotatable cutting assembly spaced from the infeed assembly and operatively attached to the frame; at least one feed wheel operatively attached to the frame and disposed between the infeed assembly and the cutting assembly, to feed wood material to said cutting assembly; a manually operable actuator which is adapted to start and stop the feed system, the actuator having at least a first and a second position; a timer operatively connected to the manually operable actuator and adapted to sense at least the first position of the actuator, whereby the timer is adapted to determine if the first position of the actuator has been (continuously) engaged for (more than) a preset time frame; and the timer being in communication with the feed system and also adapted to stop operation of the feed system if the first position has been engaged for more the preset time frame. Further, the timer may also be adapted to sense a position other than the first position of the actuator, wherein the timer is adapted to stop operation of the feed system unless the first and other than the first positions have been engaged during the preset time frame.

In still another embodiment, a method of operating a waste processing system which includes a feed system, a cutting system, and a power system adapted to power the feed system and the cutting system, at least one manually operable actuator having at least two operable positions and adapted to control at least one of the feed system and the cutting system, and a timer operatively connected to the manually operable actuator and adapted to sense if positional movement of the actuator has occurred within a first time frame is disclosed, wherein the method comprises: sensing positional movement of the actuator; prohibiting operation of at least one of the feed system and the cutting system in response to the actuator being in a predetermined position; allowing operation of at least one of the feed system and the cutting system in response to the actuator being out of the predetermined position; initializing the timer to track a first time frame in response to the actuator being out of the predetermined position; and changing operation of at least one of the feed system and the cutting system in response to at least one of the timer and actuator.

The method may further include, wherein: the sensing step comprises sensing at least a second position of the actuator; the prohibiting step comprises prohibiting operation of at least one of the feed system and the cutting system in response to the actuator being sensed in the second position; the allowing step comprises allowing operation of at least one of the feed system and the cutting system in response to the actuator being out of the second position; the initializing step comprises initializing the timer to track a first time frame in response to the actuator being out of the second position; the changing step comprises changing operation of at least one of the feed system and the cutting system in response to positional movement of the actuator being sensed; the changing step comprises changing operation of at least one of the feed system and the cutting system in response to at least one of the first time frame and positional movement of the actuator being sensed; the changing step comprises changing operation of at least one of the feed system and the cutting system in response to at least one of the expiration of the first time frame and positional movement of the actuator being sensed during the first time frame; the changing step comprises changing operation of at least one of the feed system and the cutting system in response to at least one of the expiration of the first time frame without positional movement of the actuator being sensed, and positional movement of the actuator being sensed during the first time frame; the changing step comprises prohibiting operation of the feed system in response to positional movement of the actuator not being sensed during the first time frame; the changing step comprises allowing operation of the feed system in response to positional movement of the actuator being sensed during the first time frame; and the changing step comprises prohibiting operation of at least one of the feed system and the cutting system in response to the expiration of the first time frame without positional movement of the actuator being sensed, and allowing operation of at least one of the feed system and the cutting system in response to positional movement of the actuator being sensed during the first time frame.

In yet another embodiment, a method of operating a waste processing system includes: providing a waste processing machine including a feed system, a cutting system, and a power system adapted to power the feed system and the cutting system, at least one manually operable actuator having at least two operable positions and adapted to control at least one of the feed system and the cutting system, and a timer operatively connected to the manually operable actuator and adapted to sense if positional movement of the actuator has occurred within a time frame; sensing positional movement of the actuator including a second position; prohibiting operation of the feed system in response to the actuator being sensed in the second position; allowing operation of the feed system in response to the actuator being out of the predetermined position; setting the timer to track a first time frame in response to the actuator being out of the predetermined position; changing operation of the feed system including prohibiting operation of the feed system in response to an expiration of the first time frame without positional movement of the actuator being sensed, and allowing operation of the feed system in response to positional movement of the actuator being sensed during the first time frame; and re-setting the timer to track the first time frame in response to positional movement of the actuator being sensed during the first time frame.

Other objects, advantages, and features of the invention will become apparent upon consideration of the following detailed description and drawings. As such, the above brief descriptions set forth, rather broadly, the more important features of the present novel invention so that the detailed descriptions that follow may be better understood and so that the contributions to the art may be better appreciated. There are of course additional features that will be described hereinafter which will form the subject matter of the claims.

In this respect, before explaining the preferred embodiment of the disclosure in detail, it is to be understood that the disclosure is not limited in its application to the details of the construction and the arrangement set forth in the following description or illustrated in the drawings. To wit, the waste processing system, vigilance control system, timer, safety system, and associated methods therefor of the present disclosure are capable of other embodiments and of being practiced and carried out in various ways. Also, it is to be understood that the phraseology and terminology employed herein are for description and not limitation. Where specific dimensional and material specifications have been included or omitted from the specification, or the claims, or both, it is to be understood that the same are not to be incorporated into the claims, unless so claimed.

As such, those skilled in the art will appreciate that the conception upon which this disclosure is based may readily be used as a basis for designing other structures, methods, and systems for carrying out the several purposes of the present invention. It is important therefore that the claims are regarded as including such equivalent constructions, as far as they do not depart from the spirit and scope of the present invention.

Further, the purpose of the Abstract is to enable the United States Patent and Trademark Office, the public generally, and especially the scientists, engineers, and practitioners in the art who are not familiar with the patent or legal terms of phraseology, to learn quickly, from a cursory inspection, the nature of the technical disclosure of the application. Accordingly, the Abstract is intended to define neither the invention nor the application, which is only measured by the claims, nor is it intended to be limiting as to the scope of the invention in any way.

These and other objects, along with the various features and structures that characterize the invention, are pointed out with particularity in the claims annexed to and forming a part of this disclosure. For a better understanding of the waste processing system of the present disclosure, its advantages, and the specific traits attained by its use, reference should be made to the accompanying drawings and other descriptive matter in which there are illustrated and described the preferred embodiments of the invention.

As such, while embodiments of the waste processing, vigilance, control, timing, and safety system, and associated methods therefor, are herein illustrated and described, it is to be appreciated that various changes, rearrangements, and modifications may be made therein without departing from the scope of the invention as defined by the claims.

BRIEF DESCRIPTION OF THE DRAWINGS

As a compliment to the description and for better understanding of the specification presented herein, 23 pages of drawings are disclosed with an informative, but not limiting, intention.

FIG. 4 is a diagrammatic view of a control system according to one embodiment of the present invention;

FIG. 5 is a diagrammatic view of a control system according to another embodiment of the present invention;

FIG. 6 is a diagrammatic view of a control system according to yet another embodiment of the present invention;

FIG. 7 is a diagrammatic view of a control system according to another embodiment of the present invention;

FIG. 8 is a diagrammatic view of a control system according to still another embodiment of the present invention;

DETAILED DESCRIPTION OF THE PREFERRED EMBODIMENT

The best mode for carrying out the invention is presented in terms of the preferred embodiment, wherein similar referenced characters designate corresponding features throughout the several figures of the drawings.

Figure 1:
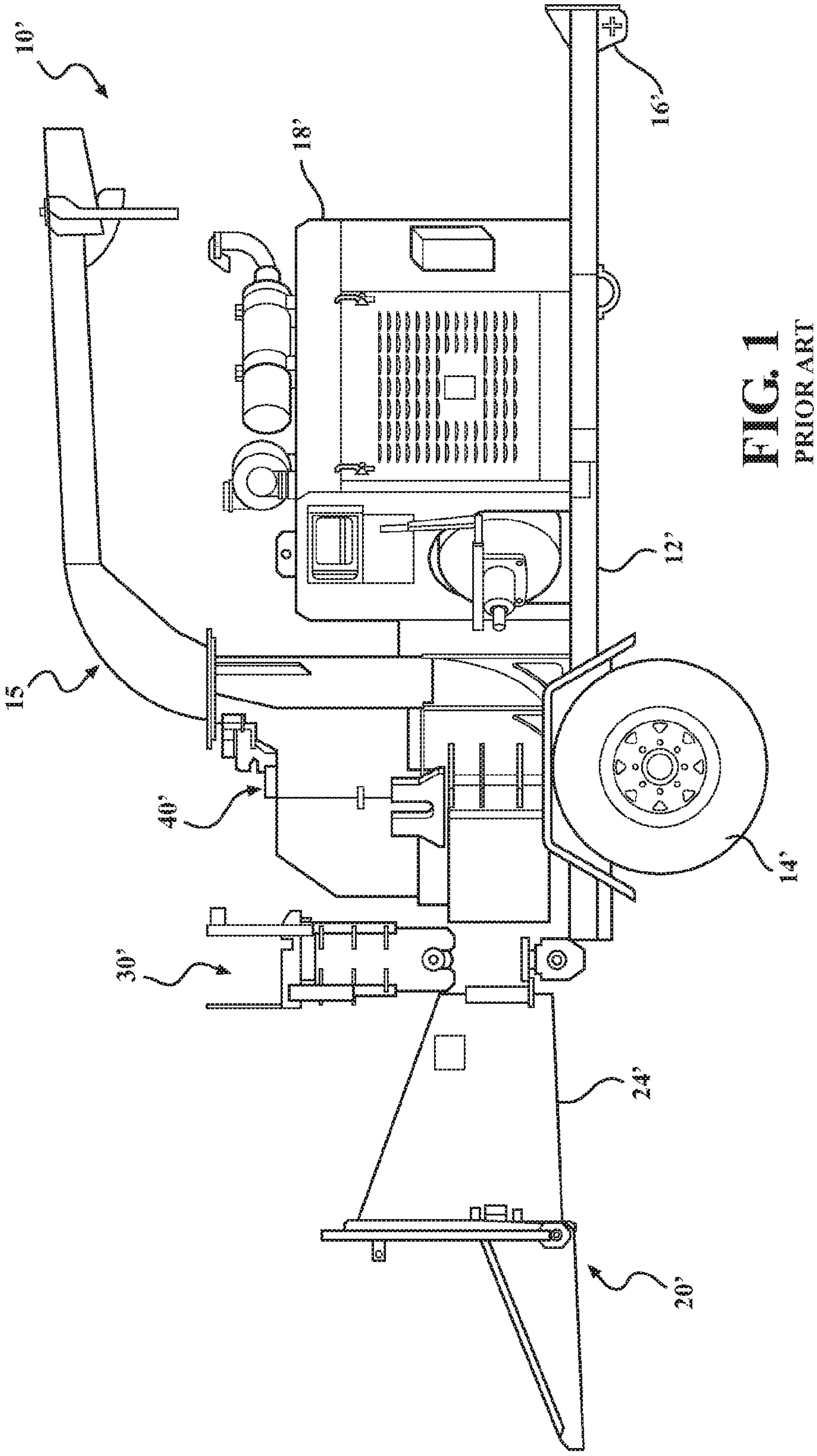
FIG. 1 PRIOR ART
FIG. 1 is a side view of a prior art disc type wood chipper.

For purposes of description herein, the terms “upper”, “lower”, “right”, “left”, “rear”, “front”, “vertical”, “horizontal”, and derivatives thereof, shall relate to the orientation illustrated in FIG. 1. However, it is to be understood that the invention may assume various alternative orientations, except where expressly specified to the contrary. It is also to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Reference will now be made in detail to the present preferred embodiments of the invention, examples of which are illustrated in the accompanying drawings. These same referenced numerals may be used throughout the drawings to refer to the same or like parts. Further, like features between the various embodiments may utilize similar numerical designations. Where appropriate, the various similar features may have been further differentiated by an alphanumeric designation, wherein the corresponding alphabetic designator has been changed. Further, the dimensions illustrated in the drawings (if provided) are included for purposes of example only and are not intended to limit the scope of the present invention. Additionally, particular details in the drawings which are illustrated in hidden or dashed lines (if provided) are to be considered as forming no part of the present invention.

As used herein, the term wood and wood products are meant to be used and defined in their broad, general, and ordinary sense, and the terminology is meant to include trees, brush, trunks, stumps, stems, branches, leaves, or the like, or anything else that could otherwise be recycled, reduced, or otherwise processed, and further includes non-naturally occurring or manufactured wood products such as lumbar, pallets, or other manufactured products that could otherwise be recycled, reduced, or otherwise processed, as is generally known within the art.

As used herein, the term waste processing system is meant to be used and defined in its general and ordinary sense. To wit, systems that recycle, reduce, or otherwise process wood products. Included therein are machines that chip, cut, grind, or otherwise reduce wood waste products and include, generally, chippers, shredders, hammer mills, hogs, shredders, grinders, and/or forestry mowers, or the like. Of course, this is not meant to be limiting in any manner and these systems may take on numerous configurations, and may be used for numerous purposes as is generally known within the art.

As used herein, the term primary system is meant to be used and defined in its general and ordinary sense. To wit, the systems of the waste processing machine that are responsible for the primary features and/or operation of the waste processing machine/system. Included therein are the feed system, the cutting system, and the power supply, source, or engine. Of course, this is not meant to be limiting in any manner and these systems may take on numerous configurations, and may be used for numerous purposes as is generally known within the art.

Generally, while waste processing machines and wood chippers are commonly known and regularly utilized to reduce branches, trees, and other bulk wood products into smaller wood chips, if operated incorrectly problems can arise and, for example, failure of the operator to follow proper procedures, guidelines, and instructions (e.g., improper usage of the waste processing machine, its various systems, and/or is safety features) may result in damage to the machine or injury. For example, operators may modify or disable one or more of the safety features in an attempt to override them.

Therefore, there is a need in the art to provide systems, devices, and methods for a waste processing system, which reduce or prevent the risks associated with these prior art waste processing machines. It is also desirable to provide waste processing systems, vigilance control systems, timers and timing systems, safety systems, and associated methods therefor that are relatively inexpensive to manufacture and operate, and are easily operable. It is further desirable to provide systems, practices, and methods which increase safety and otherwise establish or promote the safe operation of these waste processing machines. Therefore, there is a need in the art to provide systems, devices, and methods for a waste processing system that overcome the above-identified disadvantages.

As such, while contemporary machines include numerous safety features, safety control systems, and/or various controls and shutoff's which are designed to activate, either automatically or manually, when various situations, guidelines, and parameters are encountered or exceeded (e.g., in an emergency situation), it is nonetheless possible that, when these safety features and protocols are bypassed or otherwise not followed, such safety and control systems may not "activate" when desired.

For example: automatic systems can be overridden or made inoperable by an operator; while manual systems rely on manual (e.g., an operator's) activation, wherein said activation may not arise. By way of illustration, the feed control bar/system may be altered (e.g., rigged or forced) so that it remains in the forward position rather than automatically returning to the neutral position. This can occur for example when an operator forces the control bar to remain in the forward position (e.g., tying-off) so that it remains biased to the forward position and thereby defeating the safety feature (bias) that would otherwise move the bar to the neutral or reverse position.

Accordingly, a need exists for devices, systems, and methods that are, among other things: relatively inexpensive to manufacture and operate; provide for increased safety; provide reliable operation; are easily operable; and provide for increased safety. Therefore, devices, systems, and methods that solve the aforementioned disadvantages and having the aforementioned advantages are desired and disclosed herein.

More specifically, a vigilance control system for a waste processing system is disclosed for a waste processing system and includes a timer which is operatively connected to one or more manually operable actuators of the waste processing machine (e.g., for controlling at least one of the feed system and the cutting system). The timer then can ensure that the one or more manually operable actuators are manually cycled by an operator, thereby deterring an operator from defeating the safety features of such actuators. To wit, the disclosed vigilance system makes it inconvenient to bypass certain safety features of these machines.

Therefore, and while not meant to be limiting in any manner, it is envisioned that this system may offer the following advantages: The systems and methods disclosed herein may be designed to interact with, cooperate with, or primarily control one or more of the primary systems of the waste processing machine (e.g., feed system, cutting system, and power system). For example, in one embodiment, the invention will be configured in such a manner so as to allow for the operation of one or more of the primary systems of the waste processing machine such that when the present invention is in a first state, the functions and operation of one or more of the primary systems of the waste processing machine will be allowed. However, when in a second state, one or more of the primary systems of the waste processing machine will not operate as normal. For example, the feed system may be restricted in its operation; Additionally, the systems and methods disclosed herein may be designed to interact with, cooperate with, or control one or more other safety systems of the waste processing machine, whether existing or developed in future. For example, in one embodiment, the invention will be configured in such a manner so as to allow for the operation of the waste processing system such that when present invention is in a first state, the functions and operation of the waste processing system will be normal and, for example only, all other (existing) safety systems disposed on the waste processing system will operate as they would normally operate. However, when the invention is in a second state, the waste processing system will not operate as normal and, again for example only, the feed system may be restricted in its operation; In another embodiment, the devices and methods disclosed herein are retro-fitable to existing waste processing systems; In yet another embodiment, the devices and methods disclosed herein are configured so as to require the invention to be in a predetermined state for normal operation of the waste processing system. Otherwise, the waste processing system will not operate as normal; In still another embodiment, the devices and methods disclosed herein are configured so as to require the invention to be operated, cycled, or otherwise moved during a time interval, for normal operation of the waste processing system. Otherwise, the waste processing system will not operate as normal; In yet another embodiment, the devices and methods disclosed herein are designed for use with a foot actuated device; In another embodiment, the devices and methods disclosed herein are designed to be used with a feed control bar; and in yet another embodiment, the devices and methods disclosed herein are designed to be used with a feed control bar and a foot actuated control device; and in still another embodiment, the devices and methods disclosed herein are designed to replace the feed control bar.

While existing safety systems are designed to increase the operational safety of mobile or trailerable waste processing machines, some of these existing safety features may be made inoperative or otherwise disabled by an operator. For example, a biased safety device (e.g., feed control bar) may be disabled by forcing the feed control bar to remain in an operative (e.g., first) position. Contrarily, the devices and methods disclosed herein overcome these existing problems by requiring an operator to physically (e.g., manually) move an actuator in order for the waste processing machine to operate normally. As such, unless the safety device (e.g., feed control bar) is manually moved (e.g., within a certain time frame) the waste processing machine will not operate in a normal manner. Consequently, this discourages an operator from bypassing the safety feature of the feed control bar (e.g., by manually forcing and retaining the bar in the first state) as it becomes more cumbersome on the operator to bypass the various systems (e.g., by manually retain the bar in the first state), as it does to operate the waste processing machine in the proper and safe manner (e.g., move or cycle the bar from the first state).

By way of further example and with respect to a foot controlled device, normal operation of the waste processing machine requires that the operator actuate or move an actuator (e.g., move the foot pedal with their foot). However, when the operator's foot is removed from the foot pedal, the device returns to a predetermined position (e.g., neutral position) which places the waste processing machine in a neutral or off state. Accordingly, if the operator places an object on the foot pedal (e.g., a rock or log) in an attempt to retain the foot pedal in the operable (e.g., first) position, thereby attempting to bypass the safety feature of the normally biased second state, the systems, devices, and methods for a waste processing system disclosed herein will prevent such an occurrence by requiring the foot pedal to be moved or cycled within a certain time period. Otherwise, the waste processing machine will not operate normally. As such, an operator attempting to bypass the inventive systems, devices, and methods disclosed herein would be required to move the object placed on the pedal, moving or allowing movement of the pedal, and then replace the object on the pedal. These added steps would make the bypassing of the pedal more operationally intensive than if the operator simply uses the foot pedal as it was designed to be used. Consequently, the inventive systems, devices, and methods disclosed herein encourage the safe operation of the waste processing machine, use of the various safety features, and thereby increase operational safety.

For the most part hereinafter we will limit our discussion of the invention as related to a wood chipper. However, the inventive embodiments disclosed herein are not meant to be so limited (unless claimed as such), and the inventive matter disclosed herein may be utilized on any waste processing machine. Further, we will primarily limit our discussion of the invention with respect to the feed system. However, the invention herein is not meant to be so limited (unless so claimed) and the waste processing, vigilance, control, timing, and safety system, and associated methods therefor may be adapted to, controlled via, or otherwise act upon other systems including, but not limited to, the cutting and power systems. As such, the inventive systems and methods can be incorporated into the waste processing machines and feed control bars as described hereinabove, as well as other control systems that require manual engagement. For example the systems described in PCT application PCT/US2009/049754, filed Jul. 7, 2009, to Morey, entitled "Safety and Control Device, System, and Method Thereof for a Waste Processing System" which is incorporated herein by reference in its entirety. Again however, this is not meant to be limiting and the systems and methods described herein may be incorporated into any control system of a waste processing machine which would benefit from the disclosed inventive systems and methods.

Referring now to the drawings and to FIG. 1 in particular, a prior art waste processing machine 10 comprises a wood chipper shown generally at 10' and includes a frame 12' supported by a pair of wheels 14', a conventional trailer hitch 16' to allow the chipper to be towed by a vehicle (not shown), and a power source 18'. Supported on frame 12', the wood chipper 10' includes: an infeed assembly or system 20' comprising an infeed tray 22' and an infeed chute 24' to allow wood material to enter the wood chipper; a feed system 30' comprising a feed wheel assembly (not shown), the feed wheel assembly typically comprising at least one feed wheel (not shown) and one or more feed wheel housings 36', disposed between the infeed system 20' and the cutting system 40', to feed wood material to the cutting system; the cutting assembly or system 40' is spaced from the feed system 30' and comprises cutters (not shown) and a cutting assembly housing 48'; and a discharge assembly 15' comprising a discharge chute 15A'.

The power source 18' typically comprises an internal combustion engine and provides rotational energy to both the feed wheels (not shown) of the feed system 30' and the cutting disc or drum (not shown) of the cutting system 40'. The engine 18' operatively couples the feed system 30' and cutting system 40' to cause rotation of the feed wheels (not shown) and the rotatable disc or drum (not shown). The engine 18' is typically operated such that the cutting disc/drum (not shown) rotates at a relatively high velocity, while the feed wheels (not shown) rotate relatively slowly. In operation, trees, brush, and other bulk wood products are fed into the infeed chute 24' and captured between, for example, opposed, rotating feed wheels (not shown) of the feed system 30' which feed, pull, or otherwise cause the bulk wood products to encounter the cutting disc/drum (not shown) of the cutting system 40'. The cutting system then reduces the bulk wood products into chips which are expelled through discharge assembly 15' via the discharge chute 15A'.

It will be understood that the wood chipper 10 may comprise any suitable waste reducing machinery such as the trailerable wood chipper as seen in FIG. 1 or any other movable or stationary machinery used to chip, grind, cut, or otherwise reduce bulk products. While one preferred embodiment incorporates a pair of opposed, horizontally aligned feed wheels, it is also to be understood that any feed system can be incorporated into the invention, or none at all. It will be further understood that this application describes the structure and operation of the feed wheels with respect to hydraulic systems, but that the feed wheels may be powered by any other suitable method. Further, while the preferred embodiment incorporates an internal combustion engine, the wood chipper can be powered by any other suitable methods including, but not limited to, electricity, gas, diesel, or a power take-off from an auxiliary power source without departing from the scope of this invention.

Figure 1A:
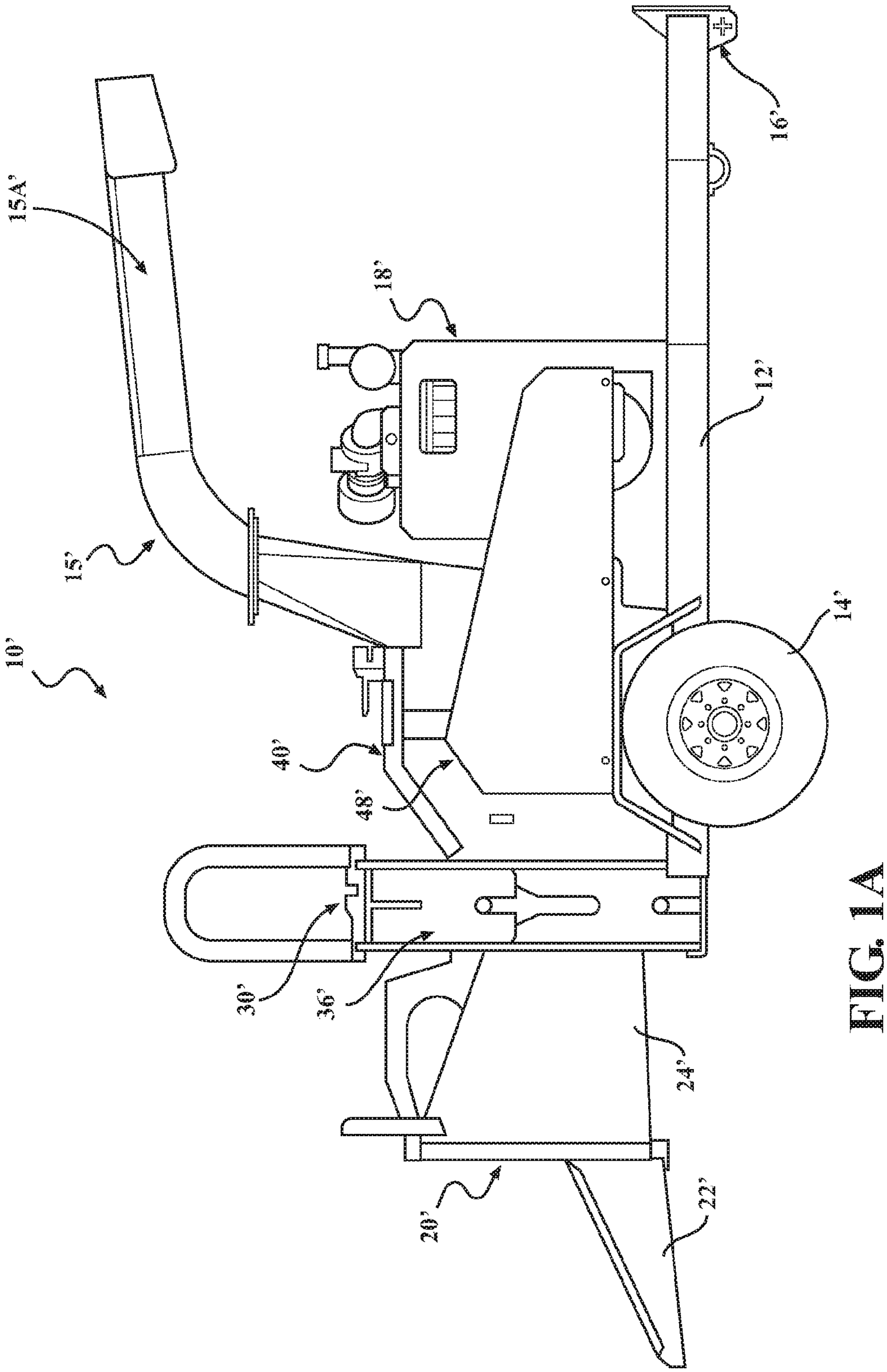
FIG. 1A PRIOR ART
FIG. 1A is a side view of a prior art drum type wood chipper.

In general, these prior art chippers 10' may include: a rotatable shaft (not shown) operatively connected to the engine 18', the engine shaft comprising a pulley (not shown) disposed about an end of the shaft (not shown); a rotatable shaft (not shown) operatively connected to the rotor (e.g., disc/drum) of the cutting assembly 40', the rotor shaft comprising a pulley (not shown) disposed about one end of the shaft; the chipper further includes a belt or belts (not shown) disposed over and interconnecting the engine and rotor shaft pulleys. It should be appreciated that the engine 18' rotates the cutting assembly 40' via the belts, and typically a hydraulic pump (not shown) pumps hydraulic fluid to rotate the feed wheels of the feed system 30'. FIG. 1 illustrates a prior art waste processing machine 10' which includes a disc style cutting assembly 40', while FIG. 1A illustrates a prior art waste processing machine 10' which includes a drum style cutting assembly 40'.

Figure 2:
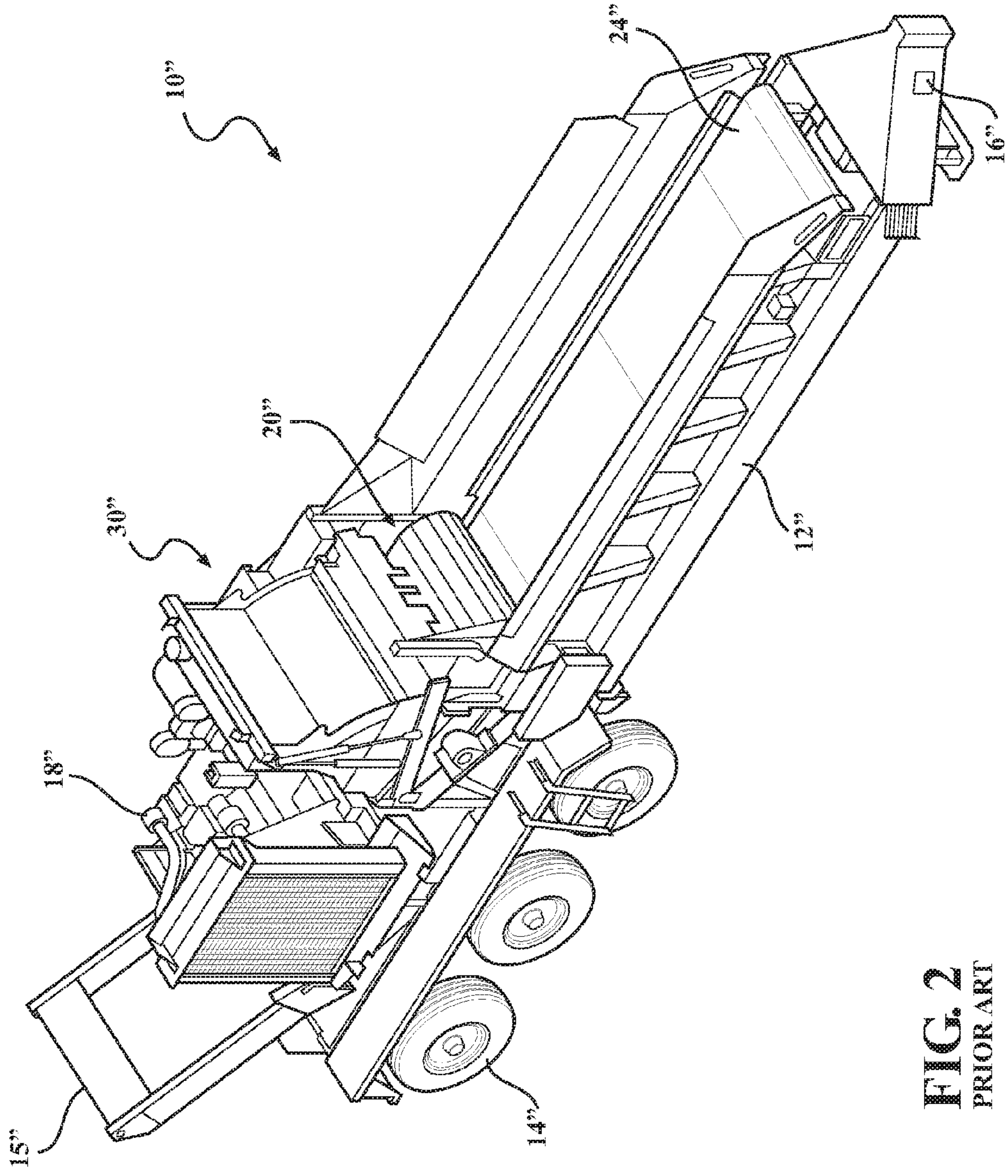
FIG. 2 PRIOR ART
FIG. 2 is a perspective view of a prior art conveyor feed waste processing system.

Referring now to FIG. 2, a prior art conveyor fed waste processing machine 10" is illustrated and comprises similar components and operation as the prior art depicted in FIG. 1, except that, inter alia, the infeed tray 22' and infeed chute 24' (of FIG. 1) are replaced with a conveyor feed system 24".

Figure 3:
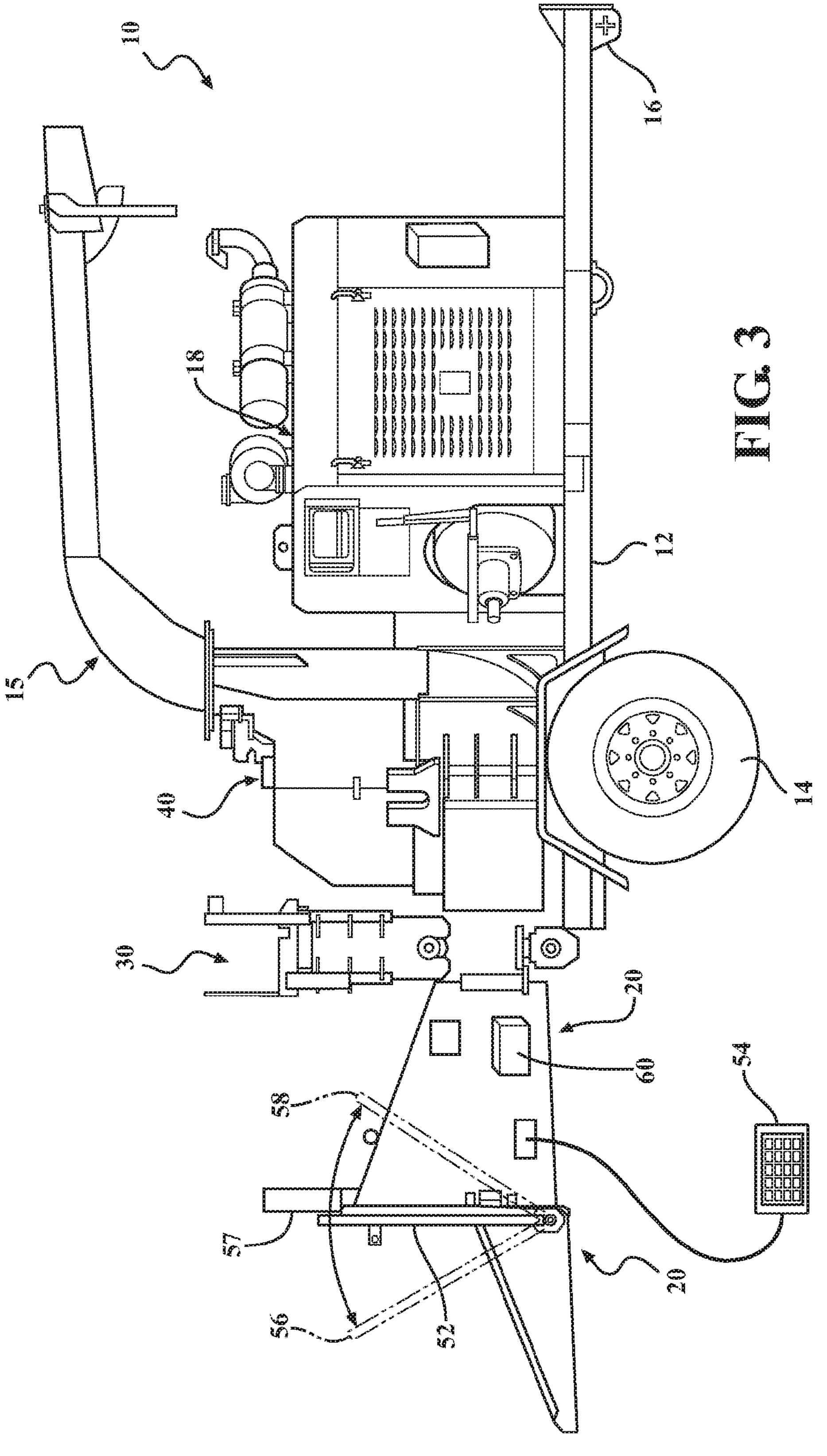
FIG. 3 is a side view of a wood chipper according to one embodiment of the present invention.

The disadvantages and drawbacks of the prior art are overcome through the waste processing system of the present invention, wherein one preferred embodiment 10 is disclosed. Referring now to FIG. 3, one embodiment of a waste processing system is shown generally at 10 and includes a frame 12 supported by a pair of wheels 14, and a trailer hitch 16 in order to allow the waste processing system to be transported by a vehicle. Supported on the frame 12 are a cutting system 40, an infeed chute 20, and a discharge chute assembly 15. A power system 18, typically comprising an internal combustion engine, is also mounted on frame 12 to provide power to both a feed system 30 and the cutting system 40.

As is generally known, operation of waste processing system 10 typically comprises providing power to the cutting system 40 and the feed system 30 through power supply 18, whereby feed system 30 feeds or supplies material to cutting system 40, and cutting system 40 is used to reduce or otherwise process the wood products which are then dispensed through discharge chute assembly 15. Cutting system 40 may comprise a rotary cutting mechanism, blade, or disc (not shown), and feed system 30 may generally comprise a feed wheel system (also not shown). Both of these systems being described in great detail in the patents cited hereinabove and those descriptions are wholly included herein, in their entirety, by reference.

It should be understood that waste processing system 10 may comprise any suitable waste reducing machinery such as the trailerable wood chipper as seen in FIG. 1, conveyer fed system of FIG. 2, or any other, typically, movable machinery used to chip, grind, cut, or otherwise reduce bulk products. Further, while the preferred embodiment incorporates a pair of opposed, horizontally aligned feed wheels, it is understood that any feed system may be utilized. It should be further understood that this disclosure describes certain structures and operations with respect to a hydraulic system, however, other powering systems may also be utilized. Still further, the waste processing system 10 is described and illustrated as being operated by an internal combustion engine, however, the system may also be powered by any other suitable method, including, but not limited to, electricity, gas, diesel, or a power take-off from an auxiliary power source, without departing from the scope of this invention. In general, cutting system 40, feed system 30, and power source 18 are known in the art. Further, it is to be understood that numerous configurations of these known devices may be used and the description herein is not meant to be limiting with respect to these systems, unless otherwise noted, and equivalent components may be used.

In a broader sense, FIG. 4 illustrates an embodiment of the control system, vigilance system, or safety system 60 which includes, is operatively connected, or otherwise in communication with an actuator 50, and includes a timer 62. Actuator 50 may comprise any actuator, switch, bar, pedal, and the like which selectively controls the operation of one or more of the primary systems of the waste processing system 10. These primary systems include the feed system 30, the cutting system 30, and the power system 18. For exemplary purposes only, the actuator 50 may comprise one or both of a feed control bar 52 and a feed control pedal 54 (FIG. 5). Of course, any other actuator 50 may also be used. Further, the discussion herein will detail the use of the feed control bar 52 and the feed control pedal 54 as they operate and interact with the feed system 30, and more particularly the feed wheels of the feed system 30. However, it is to be understood that the actuators may be configured to operate with the other primary components of the waste processing system 10, either alone or in combination with the feed wheels.

For a better understanding of the disclosed invention as a whole, we will initially focus on the description and operation of the actuators 50, via exemplary descriptions of control bar 52 and foot pedal 54. The description and operation of control system 60 will follow thereafter.

Referring now to FIGS. 3 and 5, two embodiments of actuator 50 are disclosed and include a feed control bar 52 and a feed control pedal 54, both of which have at least two operable positions (e.g., on or off). Actuator 50 is operably connected to or otherwise in communication with one or more of the primary systems of waste processing system 10, and is adapted to selectively control the operation thereof. For illustrative purposes only, the selective control of these systems may comprise selectively powering, driving (forward or reverse), interrupting, stopping, braking, or otherwise operating one or more of the primary systems of the waste processing system including, for example, the power supply 18, the cutting system 40, and the feed system 30. As illustrated (FIG. 3), actuator 52 generally comprises a feed control bar, and is generally disposed above the infeed tray 22, whereas actuator 54 generally comprises a foot pedal and further, may be positionable about waste processing system 10 and may be disposed, moved, or otherwise positioned off of (or away from) waste processing system 10 in a manner that facilitates the operators particular needs, desires, or requirements and include for example the controls and systems described in PCT application PCT/US2009/049754, filed Jul. 7, 2009, to Morey, entitled "Safety and Control Device, System, and Method Thereof for a Waste Processing System" which describes such foot pedals, as well as alternate embodiments of actuator 50, and is incorporated herein by reference in its entirety.

Generally speaking, feed control bar 52 comprises at least two operable positions (e.g., on and off) and may control the operation of the feed wheels. In the embodiment illustrated, the control bar 52 includes three positions, the positions comprising: a first state or position 56, either initiating or allowing forward operation of the feed wheels; a second state or position 57, either stopping or preventing operation of the feed wheels; and a third state or position 58, either initiating or allowing reverse operation of the feed wheels. Further, although not required, feed control bar 52 may also be biased to the second position in order to allow operation of the feed wheels in either forward or reverse only when an operator has physically (e.g., manually) moved the feed control bar and physically (e.g., manually) maintains the feed control in one of the operable positions (e.g., first or third position). Otherwise, if the bar 52 is released, the bar 52 will automatically move to the neutral or off position (e.g., second position). Of course, the machine may also be designed such that the control bar 52 remains in either the forward or reverse position when so engaged and as such, would require manual movement to the neutral position. For example, it may be beneficial to have control bar 52 remain in one of the operable positions (and not neutrally biased) such that another control may have primary (or secondary) control of the feed wheel, as for example when a foot switch as disclosed further herein is utilized and acts as primary control of the feed system.

Figure 9:
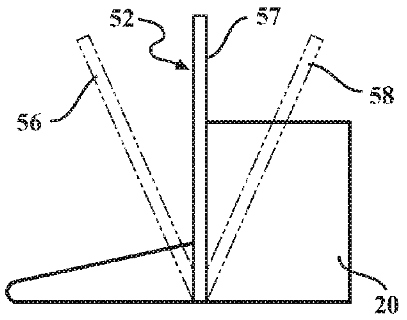
FIG. 9 is a partial side view of the infeed assembly of a wood chipper illustrating a feed control bar according to one embodiment of the present invention.

In one embodiment (FIG. 9), the first position 56 includes the bar being moved forward, towards the infeed tray 22, the second position 57 includes the bar being disposed between the first 56 and third 58 positions, and the third position 57 includes the bar being moved rearward, towards the feed system 30.

Figure 15:
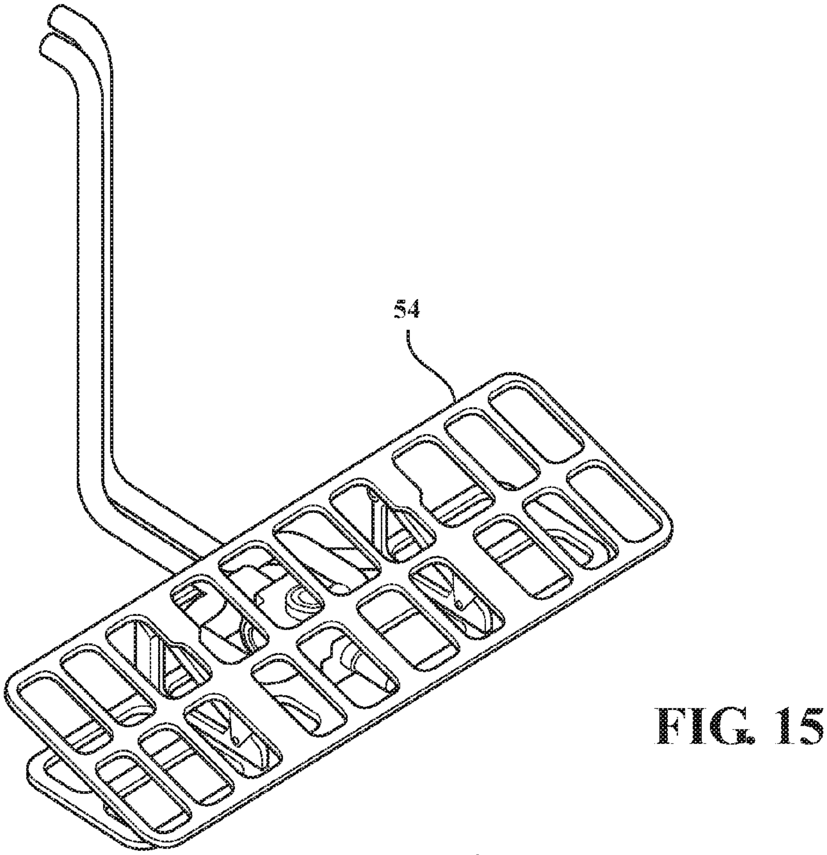
FIG. 15 is a partial perspective view of a foot pedal control according to one embodiment of the present invention.

Similarly, feed control pedal 54 comprises at least two operable positions (e.g., on and off) and may control the operation of the feed wheels. In the embodiment illustrated (FIG. 10), the control pedal 54 includes two positions, the positions comprising: a first state or position 56A, either initiating or allowing forward operation of the feed wheels; and a second state or position 57A, either stopping or preventing operation of the feed wheels. Further, it is generally the case, though not required, that the feed control pedal 54 is biased to the second position 57A in order to allow operation of the feed wheels (e.g., in a forward direction only) when an operator has manually moved and maintains the pedal 54 in the first position 56A. Otherwise, if the pedal 54 is released, the pedal 54 will automatically move to the neutral or off position (e.g., second position 57A). FIG. 15 illustrates one embodiment of such a foot pedal.

Figure 11:
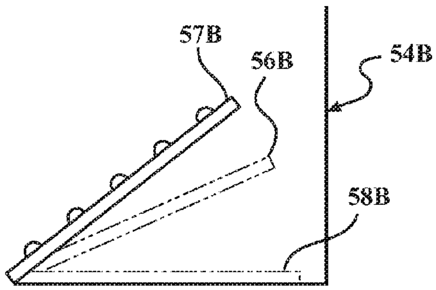
FIG. 11 is a partial sectional view of a foot pedal control according to another embodiment of the present invention.
Figure 11A:
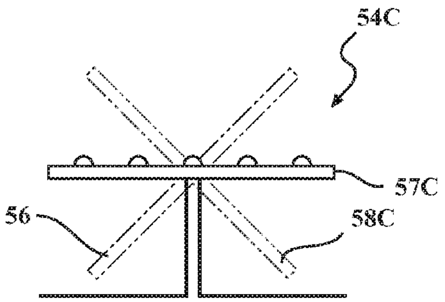
FIG. 11A is a partial sectional view of a foot pedal control according to yet another embodiment of the present invention.

Likewise, FIG. 11 illustrates a feed control pedal 54B comprising three positions: a second state or position 57B, either stopping or preventing operation of the feed wheels; a first state or position 56B, either initiating or allowing forward operation of the feed wheels; and a third position 58B, either initiating or allowing reverse operation of the feed wheels. Further, it is generally the case, although not required, that the feed control pedal 54B is biased to the second position 57B in order to allow operation of the feed wheels in either forward or reverse, only when an operator has manually moved the feed control pedal 54B, and maintains the feed control pedal 54B in one of the operable positions (e.g., first 56B or third 58B position). Otherwise, if the pedal 54B is released, the pedal 54 will automatically move to the neutral or off position (e.g., second position 57B). FIG. 11A also illustrates another embodiment of the feed pedal 54C comprising positions 56C, 57C, and 58C as described above with respect to positions 56, 57, and 58, respectively.

Figure 10:
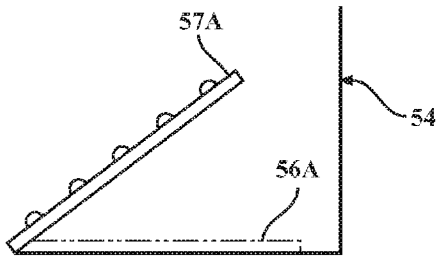
FIG. 10 is a partial sectional view of a foot pedal control according to one embodiment of the present invention.

As described herein-above, one embodiment of actuator 50 is configured to be actuated by an operator's foot, for example, the foot pedal 54, and may be configured to be operable between a first predetermined state or position 56 and a second predetermined state or position 57 (FIG. 10). For example, the first predetermined position 56 may be operatively connected to waste processing system 10 so as to provide continuity or a closed switch when an operator moves or positions pedal 54 in anything other than its normally biased (e.g., second) state; while the second predetermined position 57 may be configured to provide an open switch when the pedal 54 is not moved or so positioned (e.g., biased thereto) and otherwise remains in the second position. For example, this may be accomplished through a normally off momentary switch or valve. In this manner, when pedal 54 is depressed (e.g., moved into a first position or from a second position) by the operator the actuator 50, in this case pedal 54, provides a closed circuit and the primary systems of waste processing system 10 operate normally. However, when pedal 54 is released from the depressed state, or otherwise in a normal or unmoved state (e.g., second position), the actuator 50 is configured and operably connected to one or more of the primary systems of waste processing system 10 so as to prevent, stop, or reverse the operation of one or more of the cutting system 40, the feed system 30, and the power system 18. The operational control, interruption, or stoppage of one or more of the primary components may be accomplished by having actuator 50 in direct and operable communication with the primary components 11 (FIG. 7), or through one or more other components, and for example only, one or more other safety devices (e.g., feed control bar 52), or through the control system 60 described herein (FIG. 8).

For example only, in one embodiment, when pedal 54 is depressed, corresponding to the actuator being in a first predetermined position 56, normal operation of waste processing system 10 ensues, including normal operation of feed control bar 52 (e.g., feed control bar 52 operates normally and controls the operation of the feed wheels). However, when pedal 54 is not depressed, moved, or otherwise activated, corresponding to the actuator being in a second predetermined position 57, operation of feed control bar 52 is selectively restricted. This selective operation or restriction of feed control bar 52 may comprise, for example, removing or prohibiting control of the feed wheels via bar 52, or allowing control of the feed wheels via bar 52 only in reverse. As such, normal operation of feed control bar 52 is permitted when the pedal 54 is in the first state 56 (e.g., depressed), and restriction of the operation of feed control bar 52 occurs when the actuator is in the second predetermined position 57 (e.g., pedal 54 is released). By way of further example, when pedal 54 is in the second predetermined position 57, the operation of feed control bar 52 could be prevented, interrupted, and/or restricted from activating feed system 30. Alternatively, when actuator 54 is in the second predetermined state 57, the feed system 30 may be directly shut-off by pedal 54, or directly made to operate in a forward or reverse mode.

In another embodiment, control of the primary systems 11 is directly dependent upon the position of the foot pedal 54, irrespective of feed control bar 52. That is to say, if desired, rather than operating in conjunction with bar 52, pedal 54 may replace or supersede operation of bar 52, whereby feed control bar 52 can be removed altogether, or made redundant. And again for example only, when pedal 54 is depressed, corresponding to the actuator being in a first predetermined position 56, normal and direct operation of waste processing system 10 ensues (e.g., the feed wheels are operated in a forward direction). However, when pedal 54 is not depressed, moved, or otherwise activated, corresponding to the actuator being in a second predetermined position 57, operation of the feed wheels is restricted (e.g., the feed wheels are prohibited from operation).

In still another embodiment foot pedal 54 works in conjunction with feed control bar 52 such that, for example, feed control bar 52 must be set to and remain in the forward or reverse position (either manually or biased to remain therein), and when the foot pedal is also placed into the respective first or third positions, the feed wheels are allowed to operate in the forward or reverse direction, respectively. For example, when the feed control bar 52 is set to the first position 56 and remains therein, the foot pedal 54 can be used to initiate and/or stop the movement of the feed wheels when so positioned.

Additionally, while the operation of pedal 54 has been described with respect to bar 52, as well as the direct operation of the waste processing system 10 via pedal 54, the reverse is also true in that bar 52 may be correspondingly operated with respect to pedal 54, as well as the direct operation of the waste processing system 10 via bar 52, the operation being similar to the above described operation of pedal 54, and omitted only for the sake of brevity.

Having described the operation of the actuators 50 in detail herein-above, we now focus on the description and operation of the control system, vigilance system, and safety system 60.

In one embodiment, a control, vigilance, or safety system 60 for a waste processing machine 10 including a powered feed system 30 and a powered cutting system 40 includes a manually operable actuator 50 which is adapted to selectively control (e.g., start, stop, reverse) at least one of the feed system 30 and the cutting system 40. Of course, if desired, selective control of the power system 18 could also be affected. The actuator 50 includes at least a first 56 and a second 57 operable position, and may also comprise one or more of the feed control bar 52 and the foot pedal 54 as described in detail herein-above.

The system 60 also comprises a timer 62 operatively connected to the manually operable actuator 50, wherein the timer 62 is adapted to calculate, determine, detect, sense, receive, set, or otherwise ascertain a first state 64 and a second state 66, the timer 62 being adapted to change an operational state (e.g., switch or alternate between the first and second states) in response to a first interval 68 and the actuator 50, wherein one of the timer 62 and the actuator 50 is in communication with at least one of the feed system 30, the cutting system 40, and the power system 18 and adapted to selectively control (e.g., start, stop, and reverse) the operation thereof.

The timer 62 may comprise any mechanical, electronic, or other system or device that is capable of, either alone or combination, calculating, determining, receiving, setting, or otherwise ascertaining a first interval 68 and further, may detect, sense, or otherwise determine the position of actuator 50. In one embodiment, the interval 68 is a time period which is started in response to positional movement of actuator 50. In another embodiment, the interval 68 is started in response to an initial positional movement of actuator 50, and reset in response to a secondary positional movement of actuator 50. In yet another embodiment, the interval 68 is stopped or expires in response to positional movement of actuator 50.

For example, in one embodiment the timer 62 comprises an electronic timer that is adapted to calculate when a time period starts and ends (e.g., expires). Further, this time period may comprise: a preset time period, whether preset by the manufacturer or operator; a fixed time period, whether fixed by the manufacturer or operator; and a variable time period (e.g., set and/or varied by the operator). Interval 68 may comprise a time period during which positional movement of actuator 50 must occur in order for operation of the waste processing system 10 to continue normally. However, upon expiration of the time period, without actuator 50 having been moved, one or more primary components 11 of the waste processing system 10 are affected (e.g., the feed wheels are made inoperable). In one embodiment the time period ranges from 1 to 15 minutes. A more preferred time frame ranges from 1 to 5 minutes, and a further more preferred range is from 1 to 3 minutes.

One manner of calculating first interval 68 (e.g., the time interval) via a timer 62 is to place timer 62 in, or have timer 62 set, a condition or operational state of the timer in response to the interval. For example, when the interval 68 has not expired, the timer 62 may be in (or set) a first condition, first operational state, or first state 64, while when (or after) the interval has expired, the timer 62 may be in (or set) a second condition, second operational state, or second state 66. By way of further example: when the timer is in or sets the first state 64 (e.g., during the first interval 68), control system 60 may be arranged so as to allow operation of the feed wheels of the waste processing system in response to the first state 64, either directly or indirectly; however, when the timer is in or sets the second state 66 (e.g., outside of the first interval 68), control system 60 may be arranged so as to not allow operation of the feed wheels in response to the second state 66, either directly or indirectly.

Figure 12:
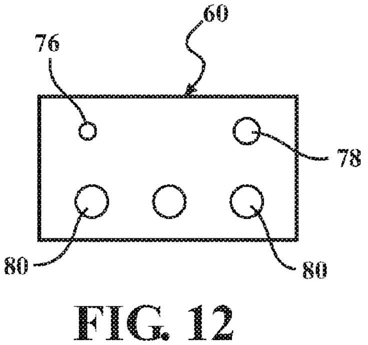
FIG. 12 is a front view of a control system housing according to one embodiment of the present invention.

Generally speaking, the first interval 68 may be (or relates) to a time frame or period 70 and will typically be a set period of time in seconds or minutes as determined by, for example, a timer, clock, or other timing system 62. However, this interval is not meant to be so restricted and the interval may be correlated with or determined by any known manner. For example, a hydraulic switch could be utilized wherein the interval is determined by the passage of fluid in a reservoir. Further, the interval 68 may be a preset time, either set by the manufacturer or before operation of the system 10, or be a fixed or variable time set by an operator. By way of further example, if the interval 68 comprises a set, preset and/or fixed time, the operator would have no control over the interval. However, a multiple setting or variable setting control knob 80 (FIG. 12), switch, or the like could be provided so that an operator could choose or vary the interval between fixed settings and further, a user-inputted or changeable control could also be provided so that an operator could set the interval 68. Yet further, a warning indicator 74 can be provided to indicate to an operator, either before or after the first interval passes that the first interval may, or has expired. For example, a warning light 76 or sound via a speaker 78 could effectuate such a warning.

As such and by way of overall yet exemplary illustration, timer 62 is operatively connected (e.g., mechanical, electrical, or wirelessly) to actuator 50 (e.g., one or both feed control bar 52 and feed control pedal 54) so as to be able to determine or sense positional movement of the actuator. This may comprise for example, the actuator 50 including switches, positional sensors, rheostats, or the like that are in communication with timer 62 so as to allow timer 62 to be able to determine or otherwise ascertain movement of the actuator 50. This may include, either alone or in any combination, sensing or determining: any movement of actuator 50; sensing the first position 56; sensing the second position 57; sensing the third position 58; and sensing any other position.

In response to the position of actuator 50 timer 62 will initiate, or provide another system with the ability to initiate, a change in the operation of at least one of the feed system, the cutting system, and the power system. For example, when timer 62 comprises a first and second state 64, 66, the timer 62 is adapted to switch, set, and/or alternate between the first and second states in response to the first interval 68 and movement of actuator 50. By way of further example, first state 64 is set or otherwise initiated by sensing movement of actuator 50, for example when foot pedal 54 is moved from the second position 57A to the first position 56A, wherein the timer 62 upon entering the first state 64 is adapted to initiate or allow operation of the feed system 30. Further, the first interval 68 is initialized (e.g., started) and the timer 62 monitors, determines, clocks, or otherwise counts down the interval 68 in response to movement out of or from the first position 57A.

During interval 68 (e.g., after initialization yet before expiration), timer 62 will monitor interval 68 for its expiration, and if interval 68 expires without the actuator 50 having been moved, the second state 66 is set or otherwise initiated wherein the timer 62 upon entering the second state 66 is adapted to stop or prevent operation of the feed system 30. However, if interval 68 does not expire without actuator 50 having been moved (or actuator 50 is moved before expiration of interval 68), the timer 62 may remain in the first state 64 (or the second state 66 will not be set), and the feed system is allowed to operate, or remain in operation. For example, if foot pedal 54, which is now out of or moved from first position 57A, is moved during interval 68, the feed system is allowed to remain in operation. Further, this movement may be, for example, moving the foot pedal 54 out of or from the first (e.g., operational) position 56A.

In this manner, the vigilance control system 60 is able to monitor or otherwise ensure that the actuators 50 are moved, operated, cycled, or otherwise attended to by an operator during a specified time 68, thereby endeavoring to ensure that the operator has not bypassed the safety features of the actuators. For example, via bypassing the normal bias of the actuators.

In another embodiment, when the actuator 50 is in the second position 57, at least one of the feed system 30 and the cutting system 40 is deactivated, and when the actuator 50 is manually moved from the second position 57, for example to any other position, the timer 62 is set to the first state 64 and will remain in the first state until the first interval 68 expires without the actuator 50 being manually moved.

In yet another embodiment, the timer 62 is set to the first state 64 until one of the first interval 68 passes without the actuator 50 being manually moved, or the actuator 50 is manually moved.

In still another embodiment, the operation of at least one of the feed system 30 and the cutting system 40 is modified if the actuator 50 is not manually moved between one or more of the operable positions 56, 57, and 58 before the first interval 68 expires.

And in still another embodiment, the operation of at least one of the feed system 30 and the cutting system 40 is modified if the actuator 50 is not manually cycled between one or more of the operable positions 56, 57, and 58 before the first interval 68 expires. Further, the manual cycling between operable positions 56, 57, and 58 may be restricted as having to occur within a second interval or time 72 before modifying control of one of the primary systems. In one embodiment the second interval or time period 72 ranges from 1 to 60 seconds. A more preferred time frame ranges from 1 to 30 seconds, and a further more preferred range is from 1 to 5 seconds, which would assist in the prevention of abrupt starts and stops to the various primary systems. Further yet, the manual cycling between operable positions 56, 57, and 58 may be restricted as having to occur within the first interval.

In still another embodiment, when the first interval 68 passes without the actuator 50 being manually moved, the timer 62 is set to the second state. Further, at least one of the timer 62 and the actuator 50 deactivates at least one of the feed system 30, the cutting system 40, and the power system 18 in response to the second state 66 being set. Further yet, at least one of the timer 62 and the actuator 50 may reverse the feed system 30 in response to the second state 66 being set. For example, the timer 62 may reverse the feed system 30 in response to the second state 66 being set.

In yet another embodiment, at least one of the timer 62 and the actuator 50 deactivates at least one of the feed system 30, the cutting system 40, and the power system 18 in response to the movement between at least the first 57 and second 58 operable positions of the actuator 50. Further, at least one of the timer 62 and the actuator 50 reverses the feed system 30 in response to the movement of the actuator 50. For example, the timer 62 may reverse the feed system 30 in response to the movement of the actuator 50.

In still another embodiment, the actuator 50 is adapted to start, stop, and reverse the feed system 30. Further, the actuator 50 may comprise any known switch, or may comprise a feed control bar 52. Yet further, actuator 50 may be biased to remain in the second position 57. Additionally, actuator 50 may be adapted to be actuated by an operators foot. For example, the actuator 50 may comprise a foot pedal 54. Of course, the control system 60 may utilize an actuator 50 that comprises both the feed control bar 52 and a foot pedal 54, each having at least two operable positions 56 and 57 and 56A and 57A, respectively. Yet further, the first interval 68 may comprise a preset time interval and still further, the first interval may comprise a user variable time interval 68. The actuator 50 may also be in mechanical communication with the waste processing system 10.

In still another embodiment, the control system 60 comprises a timer 62 which is operatively connected to at least one of the feed system 30, the cutting system 40, and the power system 18, and deactivates at least one of the feed system 30, the cutting system 40, and the power system 18 in response to the second state 66 being set. For example, the timer 62 may be operatively connected to the feed system 30 and deactivate the feed system in response to the second state 66 being set. Alternatively, the timer 62 may be operatively connected to the feed system 30 and reverse the feed system in response to the second state 66 being set.

The control system as set forth herein may also comprise a timer 62 which is electronic, an interval 68 which comprises a preset time, and an interval 68 which comprises a user settable time. Further, the system 60 may include a warning indicator 74 to indicate to an operator, before the first interval 68 passes, that the first interval 68 may expire.

In another, further embodiment, a vigilance control system 60 for a waste processing machine 10 including a feed system 30, a cutting system 40, and a power system 18 adapted to power the feed system 30 and the cutting system 40, and a manually operable actuator 50 having at least two operable positions 56, 57, and 58 and adapted to control at least one of the feed system 30, the cutting system 40, and the power system 18, comprises a timer 62 for monitoring a time period 68, the timer 62 being adapted to operatively connect to at least one of the feed system 30 and the cutting system 40, and further adapted to operatively connect to the actuator 50 and sense or determine movement thereof (e.g., in and/or between operable positions 56, 57, and 58), wherein in response to the expiration of the time period 68 or the sensed movement of the actuator 50, the timer 62 is adapted to selectively control (e.g., stop, remove power from, and/or reverse) at least one of the feed system 30 and the cutting system 40.

For example, the selective control may include deactivating the feed system 30 in response to the expiration of the time period 68 without sensed movement of the actuator 50. By way of another example, the actuator 50 may include a first 56 and a second 57 position wherein when the actuator is in the second position 57 the feed system 30 is disabled, and when the actuator 50 is in the first position 56 the feed system 30 is enabled and the timer 62 is set to the first state 64 and will remain in the first state until the time period 68 expires without the actuator 50 being manually moved. Yet further, when the time period 68 expires without the actuator 50 being manually moved, the timer 62 may be set to the second state 66. And, still further, the first state 64 may be maintained subject to the actuator 50 being moved to the second position 57 and when moved to the second position, the timer 62 may be set to the second state 66.

In yet still another embodiment, a timer 62 for a waste processing machine 10 which includes a feed system 30, a cutting system 40, and a power system 18 adapted to power the feed system 30 and the cutting system 40, and a manually operable actuator 50 having at least two operable positions 56, 57, and 58 and adapted to control at least one of the feed system 30, the cutting system 40, and the power system 18, comprises a first state 64 and a second state 66 and is adapted to alternate or switch between the first and second states in response to at least one of a time period 68 having occurred and the actuator 50 being moved between the at least two operable positions 56, 57, and 58. The timer 62 may also be adapted to operatively connect to at least one of the feed system 30 and the cutting system 40, whereby the timer 62 is adapted to modify operation of at least one of the feed system 30 and the cutting system 40 if the actuator is not manually moved between the operable positions 56, 57, and 58 of the actuator 50 before the time period 68 expires. Further, the timer 62 may be adapted to modify operation of the feed system 30 by deactivating the feed system if the actuator 50 is not manually moved before the time period 68 expires.

Yet another embodiment includes a waste processing machine 10 which comprises: a frame 12; an infeed assembly 20 operatively attached to the frame 12; a rotatable cutting assembly 40 spaced from the infeed assembly 20 and operatively attached to the frame 12; at least one feed wheel (not shown) operatively attached to the frame 12 disposed between the infeed assembly 20 and the cutting assembly 40 to feed wood material to the cutting assembly 30; a manually operable actuator 50 adapted to control at least one of the feed system 30 and the cutting system 40, the actuator 50 having at least two operable positions (e.g., 56, 57, and 58); a timer 62 operatively connected to the manually operable actuator 50, adapted to sense positional movement of the actuator 50 (or be provided with said positional information), and adapted to determine if positional movement of the actuator 50 has occurred within a preset time frame 68; at least one of the timer 62 and the actuator 50 in communication with at least one of the feed system 30 and the cutting system 40, and adapted to control the operation thereof (e.g., in response to the first 64 and second 66 states of the timer 62; in response to the movement of the actuator 50; and/or movement between the at least first (56) and second (57) operable positions of the actuator 50); whereby operation of at least one of the feed system 30 and the cutting system 40 is modified if the timer 62 does not sense positional movement of the actuator 50 during the preset time frame 68.

In still another embodiment, a waste processing machine 10 comprises: a frame 12; an infeed assembly 20 operatively attached to the frame 12; a rotatable cutting assembly 40 spaced from the infeed assembly 20 and operatively attached to the frame 12; at least one feed wheel (not shown) operatively attached to the frame 12 and disposed between the infeed assembly 20 and the cutting assembly 40 to feed wood material to the cutting assembly 30; a manually operable actuator (e.g., 52, 54) adapted to start and stop the feed system 30, the actuator having at least having at least a first and a second position (e.g., 56, 57, and 58); a timer 62 operatively connected to the manually operable actuator (52, 54) and adapted to sense (or be provided with) at least the first position 56 of the actuator, the timer 62 adapted to determine (or be provided with) if the first position 56 of the actuator (52, 54) has been continuously engaged for more than a preset time frame 68; the timer 62 in communication with the feed system 30 and adapted to stop operation of the feed system if the first position 56 has been continuously engaged for more the preset time frame 68. Further, the timer 62 may be adapted to sense (or be provided with) a position other than the first position 56 (e.g., the second or third position 57, 58) of the actuator, the timer 62 adapted to stop operation of the feed system 30 unless the first 56 and other than the first (e.g., 57, 58) positions have been engaged during the preset time frame 68. Utilizing this embodiment would allow the actuators 52 and/or 54 to be cycled (e.g., moved from on or first position 57; to off, neutral, or second position 57; and back to on or first position 57) during the preset time frame 68 in order to allow normal operation of waste processing system 10.

Figure 13:
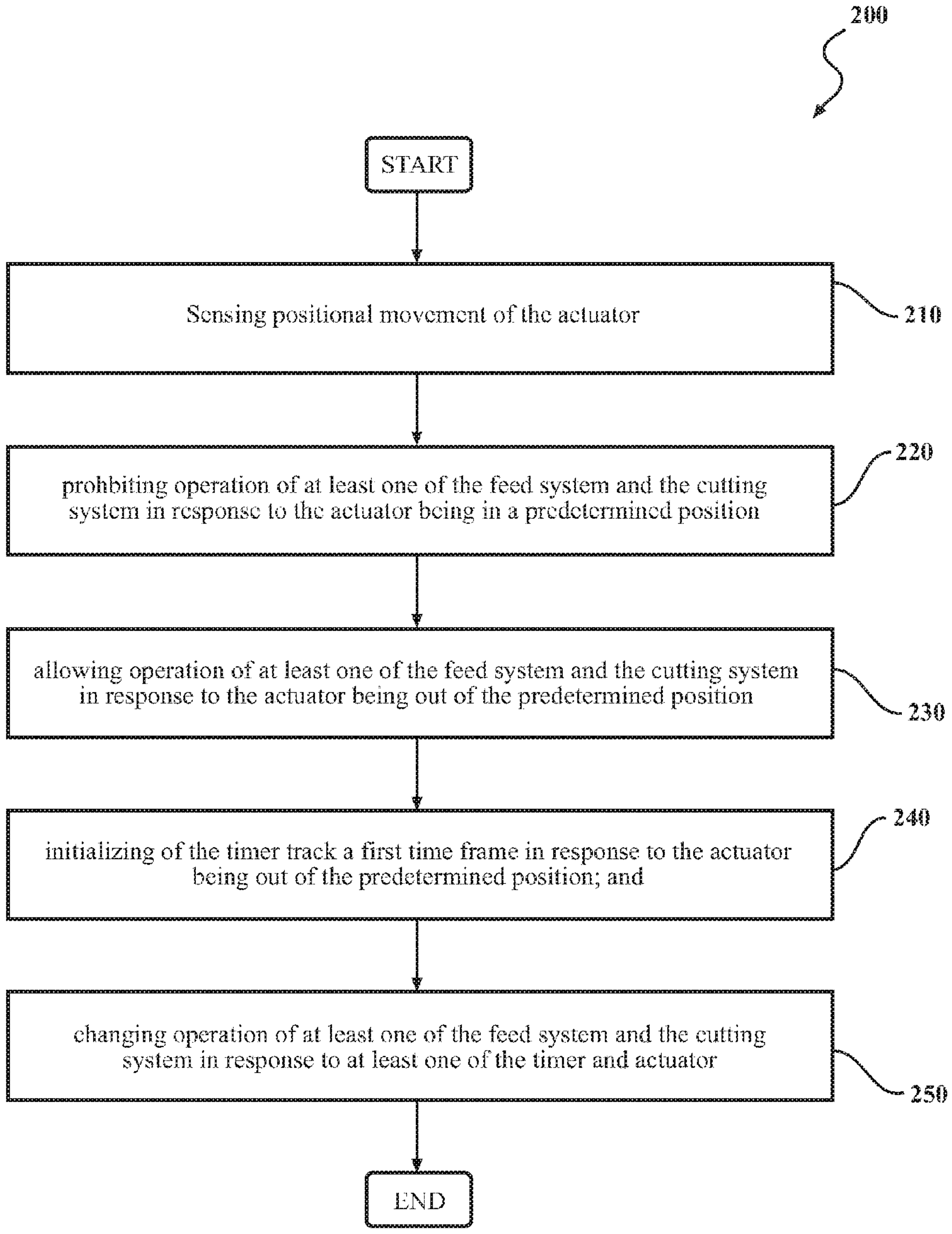
FIG. 13 is a flow chart illustrating a method of operating a waste processing system according to one embodiment of the present invention.

Additionally, in a waste processing system comprising: at least one manually operable actuator (50, 52, 54), each having at least two operable positions (56, 57, and 58) and adapted to control at least one of the feed system 30 and the cutting system 40; and a timer 62 operatively connected to the manually operable actuator (50, 52, 54) and adapted to sense if positional movement of the actuator has occurred within a time frame 68, a method (200) of operating (FIG. 13) a waste processing system 10 is disclosed which includes: (210) sensing positional movement of one or more actuators (50, 52, 54). For example, the sensing step 210 may comprise sensing at least a second position 57 of the actuator (50, 52, 54); (220) prohibiting operation of at least one of the feed system 30 and the cutting system 40 in response to the actuator (50, 52, 54) being in a predetermined position (56, 57, and 58). For example, the prohibiting step 220 may comprise prohibiting operation of at least one of the feed system 30 and the cutting system 40 in response to an actuator (50, 52, 54) being sensed or determined to be in the second position 57; (230) allowing operation of at least one of the feed system 30 and the cutting system 40 in response to one or more actuators (50, 52, 54) being out of the predetermined position (56, 57, and 58). For example, allowing operation of at least one of the feed system 30 and the cutting system 40 in response to an actuator (50, 52, 54) being out of the second position 57 (e.g., in a first 56 or third 58 position, or anywhere other than the second position 57); (240) initializing the control system 60 to track a first time frame 68 in response to one or more actuators (50, 52, 54) being out of the predetermined position. For example, initializing the timer 62 to track the time frame 68 in response to an actuator (50, 52, 54) being out of the second position 57; and (250) changing operation of at least one of the feed system 30 and the cutting system 40 in response to at least one of the control system 60 and one or more actuators (50, 52, 54).

Further, the changing step 250 may further comprise, for example: changing operation of at least one of the feed system 30 and the cutting system 40 in response to the expiration of the first time frame 68 and/or movement of the actuator (50, 52, 54) during the time frame 68; changing operation of at least one of the feed system 30 and the cutting system 40 in response to positional movement of one or more actuators (50, 52, 54) being sensed; changing operation of at least one of the feed system 30 and the cutting system 40 in response to at least one of the first time frame 68 and positional movement of one or more actuators (50, 52, 54) being sensed; changing operation of at least one of the feed system 30 and the cutting system 40 in response to at least one of the expiration of the first time frame 68 and positional movement of one or more actuators (50, 52, 54) being sensed during the first time frame 68; changing operation of at least one of the feed system 30 and the cutting system 40 in response to at least one of the expiration of the first time frame 68 without positional movement of one or more actuators (50, 52, 54) being sensed, and positional movement of one or more actuators (50, 52, 54) being sensed during the first time frame 68.

The changing step 250 may further comprise, for example: prohibiting operation of at least one of the feed system 30 and the cutting system 40 in response to positional movement of one or more actuators (50, 52, 54) not being sensed during the first time frame 68; allowing operation of at least one of the feed system 30 and the cutting system 40 in response to positional movement of one or more actuators (50, 52, 54) being sensed during the first time frame 68; and prohibiting operation of at least one of the feed system 30 and the cutting system 40 in response to the expiration of the first time frame 68 without positional movement of one or more actuators (50, 52, 54) being sensed, and allowing operation of at least one of the feed system 30 and the cutting system 40 in response to positional movement of one or more actuators (50, 52, 54) being sensed during the first time frame 68.

Figure 14:
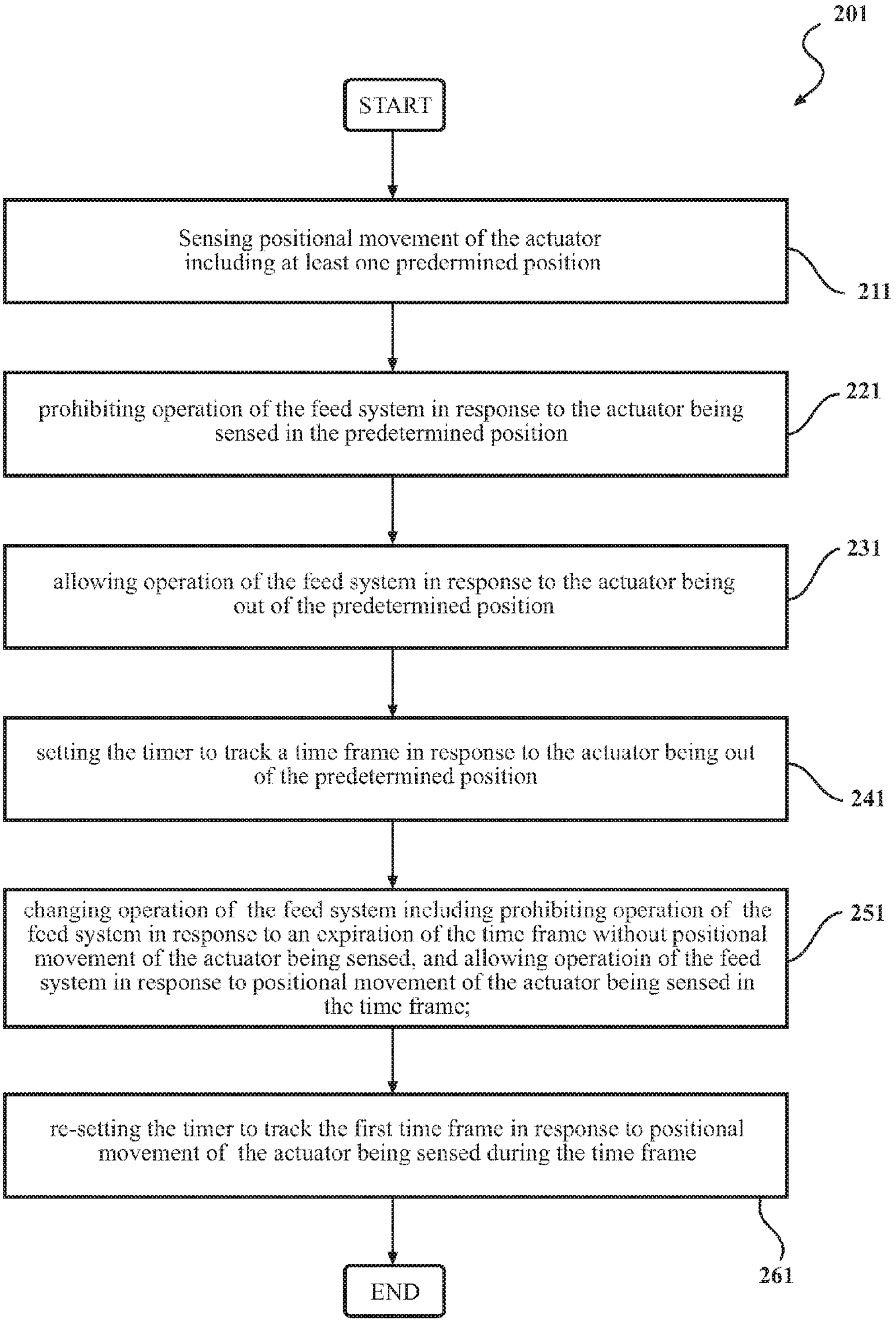
FIG. 14 is a flow chart illustrating a method of operating a waste processing system according to another embodiment of the present invention.

By way of yet another embodiment (FIG. 14), another method (201) of operating a waste processing system 10 is disclosed which includes, in a waste processing system comprising a feed system 30, a cutting system 40, and a power system 18 adapted to power the feed system 30 and the cutting system 40, at least one manually operable actuator (50, 52, 54) having at least two operable positions (56, 57, and 58) and adapted to control at least one of the feed system 30 and the cutting system 40, and a timer 62 operatively connected to the manually operable actuator (50, 52, 54): sensing (211) positional movement of the actuator (50, 52, 54) including at least one predetermined position (e.g., a second position 57); prohibiting (221) operation of the feed system 30 in response to the actuator (50, 52, 54) being in the predetermined position (e.g., second position 57); allowing (231) operation of the feed system 30 in response to the actuator (50, 52, 54) being out of the predetermined position (e.g., second position 57); setting (241) the timer 62 to track a time frame 68 in response to the actuator (50, 52, 54) being out of the predetermined position (e.g., second position 57); changing (251) operation of the feed system 30, including prohibiting operation of the feed system 30 in response to an expiration of the time frame 68 without positional movement of the actuator (50, 52, 54), and allowing operation of the feed system 30 in response to positional movement of the actuator (50, 52, 54) during the time frame 68; and re-setting (261) the timer 62 to track the time frame 68 in response to positional movement of the actuator (50, 52, 54) during the time frame 68.

For the sake of brevity: we will assume herein that the first position 56 of actuator 50 will move the feed wheels in a forward direction (e.g., moving wood products towards or into the cutting system 40); the third position 58 of actuator 50 will move the feed wheels in a reverse direction (e.g., moving wood products out of or away from the cutting system 40); and the second position 57 of actuator 50 will otherwise cease operation the feed wheels. Of course, this is not meant to be limiting and the positions 56, 57, and 58 may operate, cease to operate, or otherwise change operation of the feed wheels in any desired arrangement. Further, other systems may be utilized either in combination with or exclusive too the feed wheels, and still further, the direction or change of operation of these one or more primary systems may comprise forward, reverse, and neutral or off, either in any combination or exclusive thereto.

It is worth noting the described actuator 50 may be any actuator that is adapted to control one or more of the primary systems 11. Again for example only, a feed control bar 52 and a feed control pedal 54 may be utilized, and waste processing system 10 may comprise one or both (or more) actuators 52 and 54. Further, actuators 52 and 54 may be used separately or in combination with one another, and actuators 52 and 54 may be operatively in communication with one another, or separately or in combination with one or more of the primary systems 11 of waste processing system 10. Further as used herein, the sensing of, alerting of, or the determination of the movement of the actuators (e.g., to the timer) may be accomplished in numerous manners including known devices such as, for example, switches, rheostats, positional sensors, and the like. Further, Further as used herein, the communication of the movement or position of the actuators (e.g., to the timer) may be accomplished in numerous manners including such known devices and yet further, the systems, controls, and other devices used to effectuate this purpose may comprise individual systems or any combination thereof, and further may be mechanical, electrical, or hydraulic in nature.

In use then, and by way of example only, the waste processing system 10 is utilized to chip, cut, grind, or otherwise reduce wood products and may be operated in the following manner: the waste processing system 10 is otherwise made ready for use by starting power system 18 and allowing the cutting system 40 to reach a normal operating speed. Once the operating speed of cutting system 40 is achieved, wood products may be introduced into or onto the infeed system 20, which may comprise an infeed tray and chute combination, or an infeed conveyor (see generally FIGS. 1-2). Typically, in order to initiate movement of the feed wheels of feed system 30, an actuator 50 is required to be moved from, for example, a neutral or off position (e.g., second position 57) to a first position 56. If a feed control bar 52 is used, the feed control bar 52 is moved to the first position 57 to initiate forward movement and moved to position 58 for reverse movement of the feed wheels. If a feed control pedal 54 is used, the feed control pedal 54 is moved to the first position 56B to initiate forward movement and moved to position 58B for reverse movement of the feed wheels. If feed controls 52 and 54 are both utilized, then both controls 52 and 54 are moved to the first position 56 to initiate forward movement and both moved to position 58 for reverse movement of the feed wheels, or in any combination thereof.

Henceforth we will describe only the feed control pedal 54. Therefore, to feed wood products to the waste processing system 10, pedal 54 is moved to the first position 56. In response to this movement, control system 60 will start to calculate interval 68. For example, timer 62 will start to count down from a preset time. Also in response to this movement, control system 60 or timer 62 may set or be set into a first state 64 which operates or allows (e.g., an operational state change is made) forward operation of the feed wheels. Of course, forward motion of the feed wheels may be initiated by the control system 60, timer 62, pedal 54, or any other control system, and the setting of a desired state is merely exemplary. If the timer 62 (or control system 60) reaches an end or expiration of the time frame 68 without having sensed or received an indication of movement of pedal 54, the operation of the feed wheels will be changed (e.g., stopped or having the power removed). For example, control system 60 or timer 62 may set or be set into a second state 66 which ceases operation, does not allow, or reverses (e.g., an operational state change is made) operation of the feed wheels. Again, cessation, not allowing, or reversing motion of the feed wheels may be initiated by the control system 60, timer 62, pedal 54, or any other control system, and the setting of a desired state is merely exemplary. However, if the timer 62 (or control system 60) does not reach an end or expiration of the time frame 68 without having sensed or received an indication of movement of pedal 54, the operation of the feed wheels will continue to be allowed. This may occur for example by keeping the control system 60 or the timer 62 in the first state 64, cycling to the second state 66 and back to the first state 64, or in any other manner and by any other system such that the operation of the feed wheels (e.g., in the forward direction) is allowed, continues, or is otherwise maintained (e.g., in the forward direction). Additionally, upon sensing movement, control system 60 or timer 62 may reset or otherwise reinitialize the timer so that the operation of the waste processing system 10 can continue as long as pedal movement is detected within the time frame 68, and within each reset time frame.

Further, in another embodiment, cycling the pedal 54 through one or more predefined positions (e.g., 56, 57, 58) may be required in order to continue operation. For example, by cycling the pedal 54 from the first position 56, to the second position 57, and back to the first position 56. Yet further, this cycling may be required to occur within a certain second time frame or interval in order to continue operation.

Figure 16:
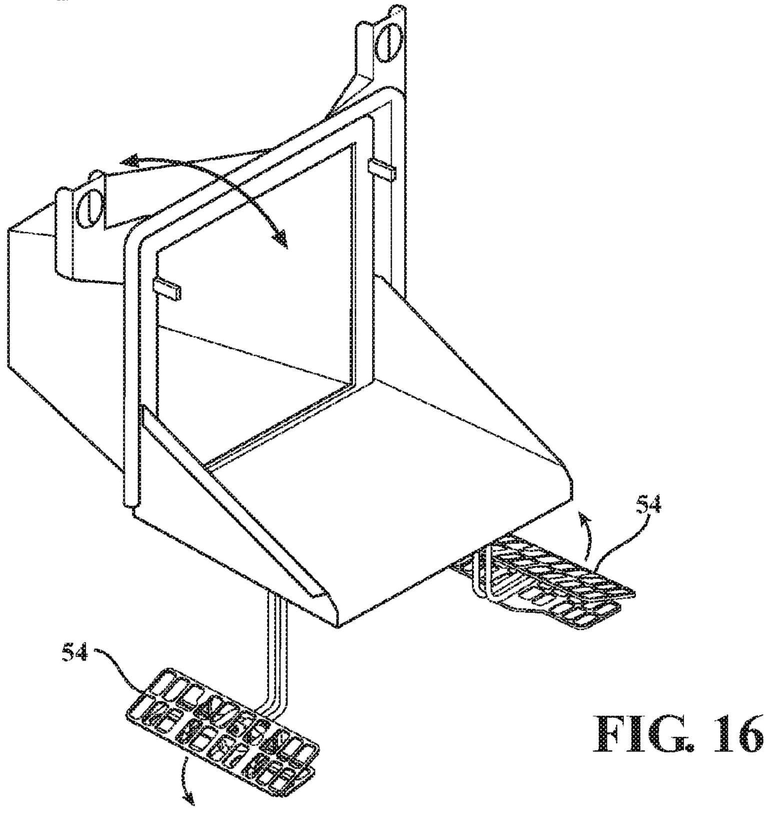
FIG. 16 is a partial perspective view of an infeed assembly of a wood chipper and a pair of foot pedal controls according to another embodiment of the present invention.
Figure 17:
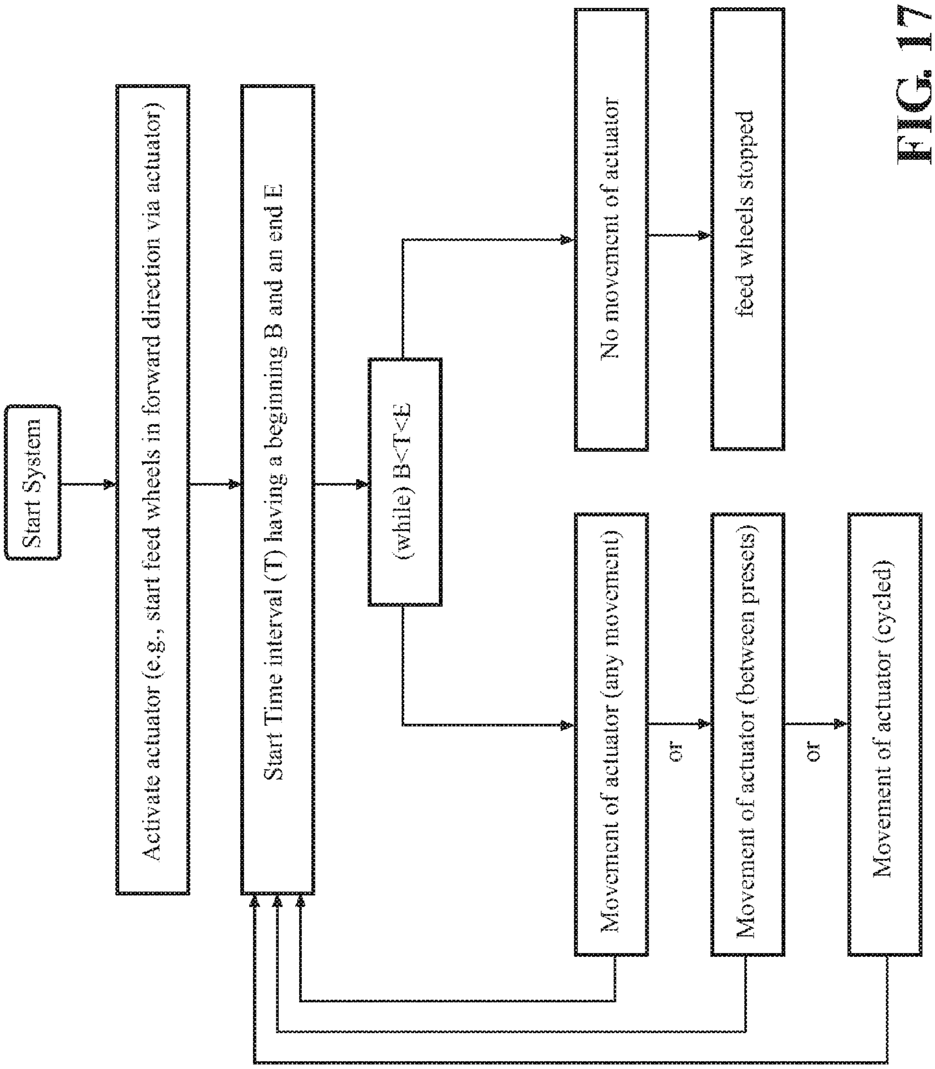
FIG. 17 is a flow chart illustrating operation a waste processing system according to another embodiment of the present invention.
Figure 18:
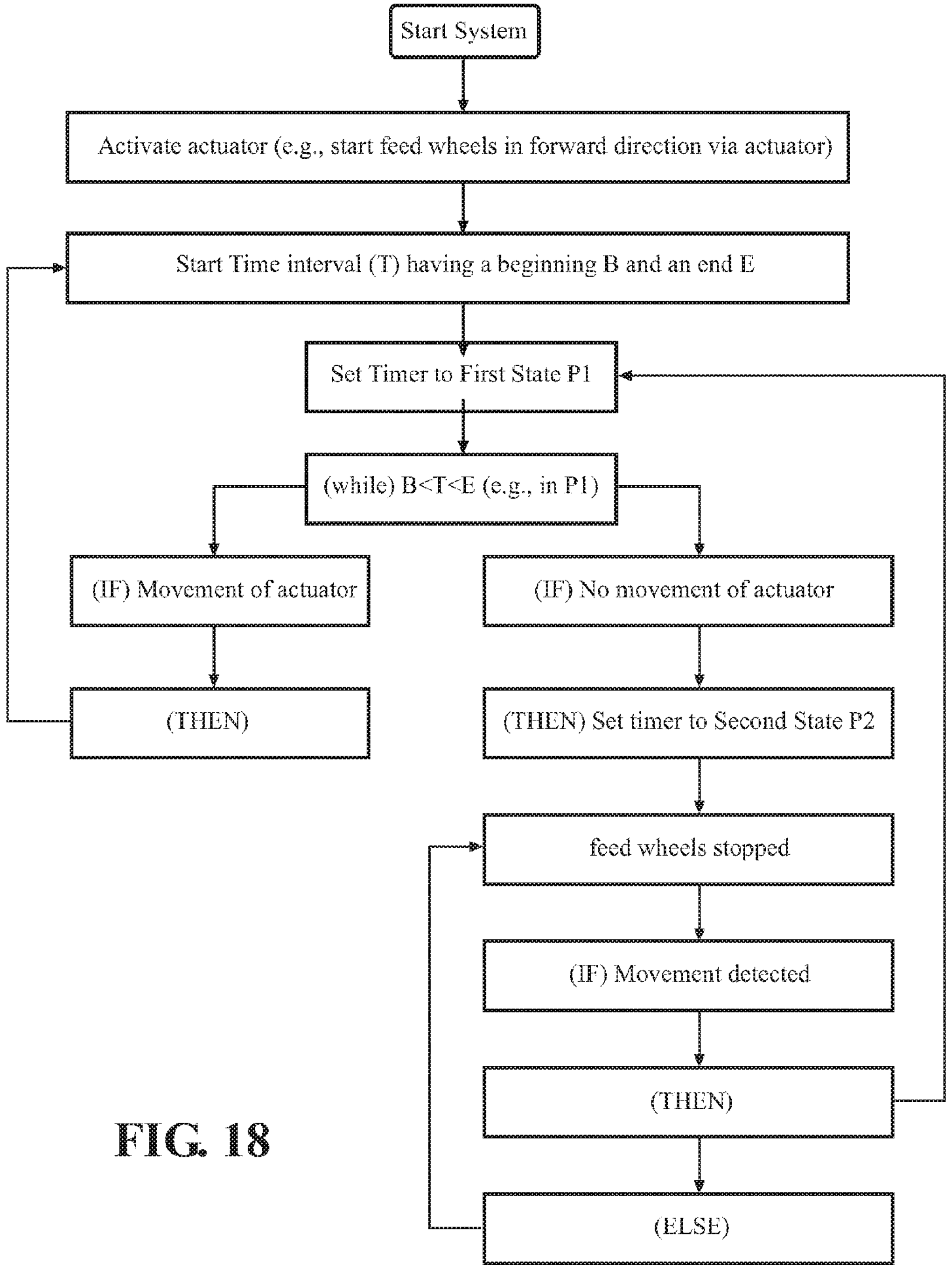
FIG. 18 is a flow chart illustrating operation a waste processing system according to yet another embodiment of the present invention.
Figure 19:
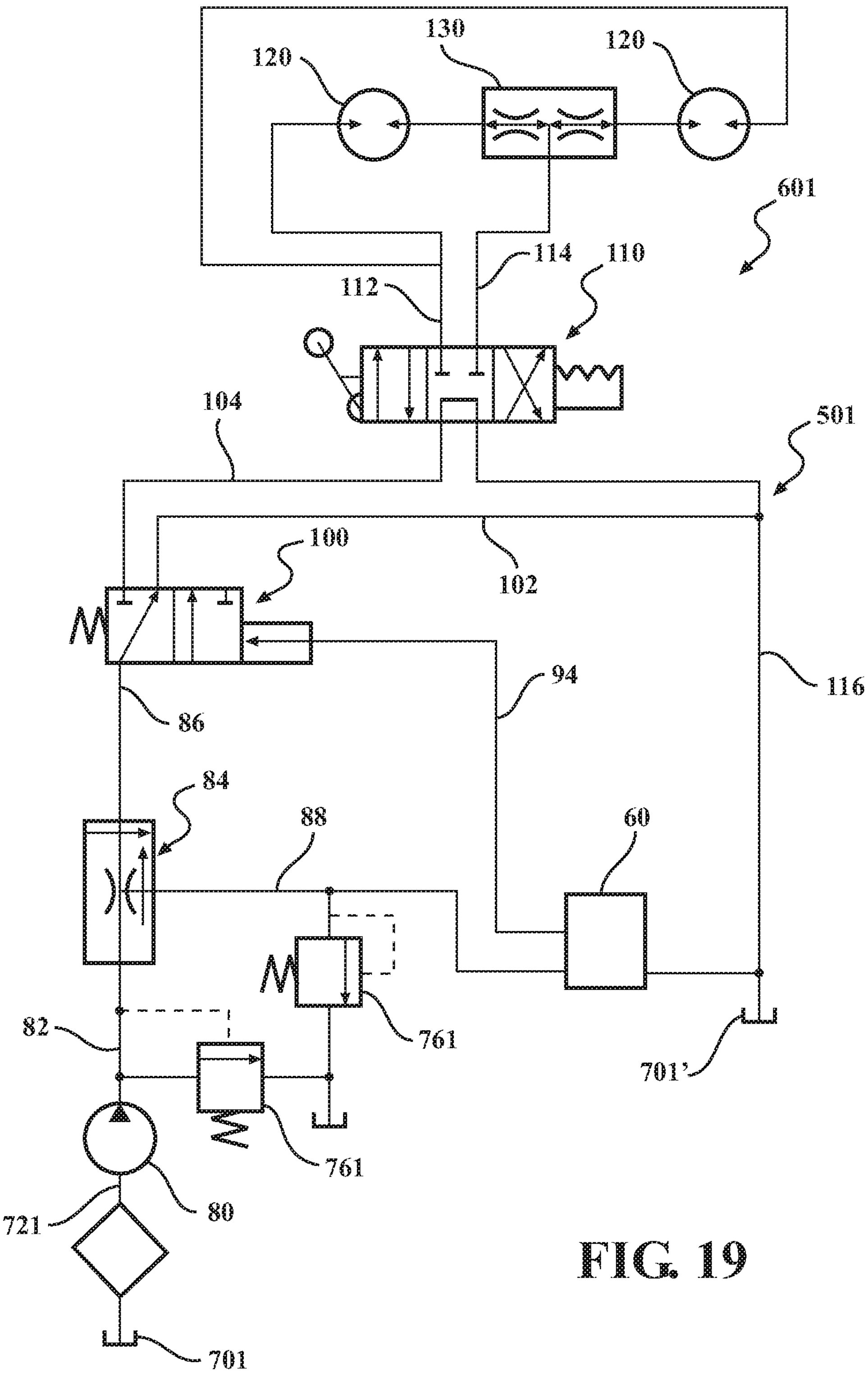
FIG. 19 is a diagrammatical view of the hydraulic system of the waste processing system according to one embodiment of the present invention.
Figure 20:
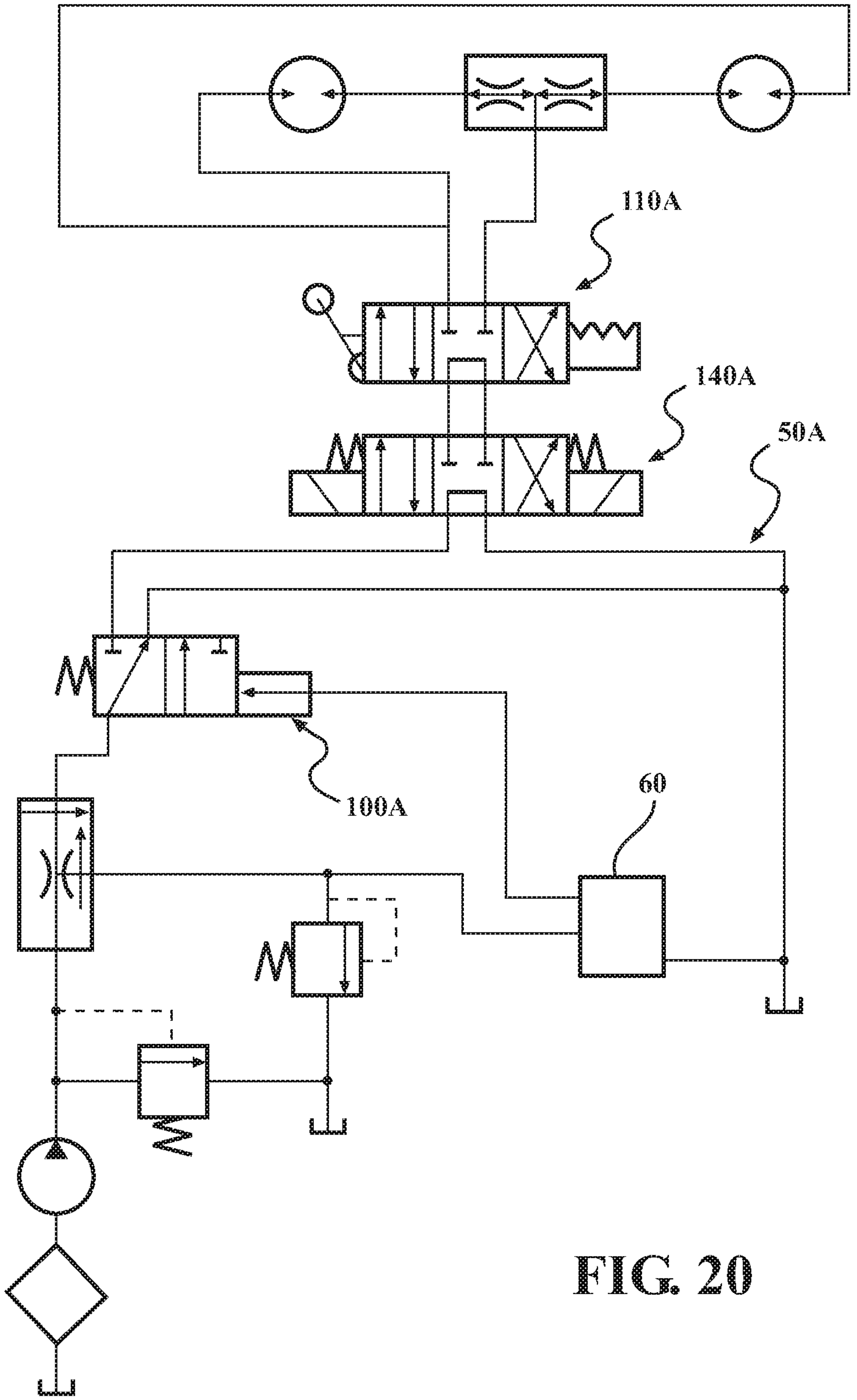
FIG. 20 is a diagrammatical view of the hydraulic system of the waste processing system according to another embodiment of the present invention.
Figure 21:
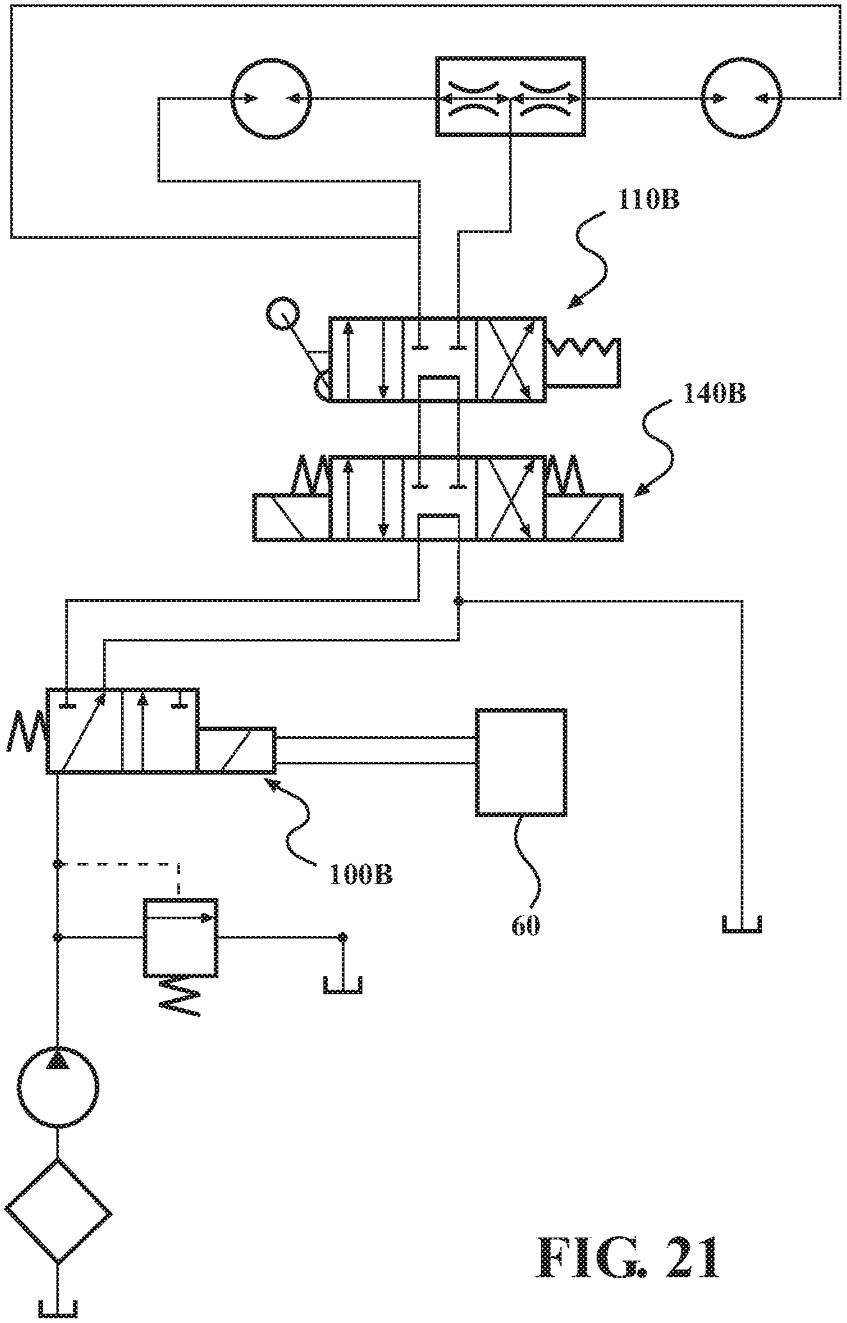
FIG. 21 is a diagrammatical view of the hydraulic system of the waste processing system according to yet another embodiment of the present invention.
Figure 22:
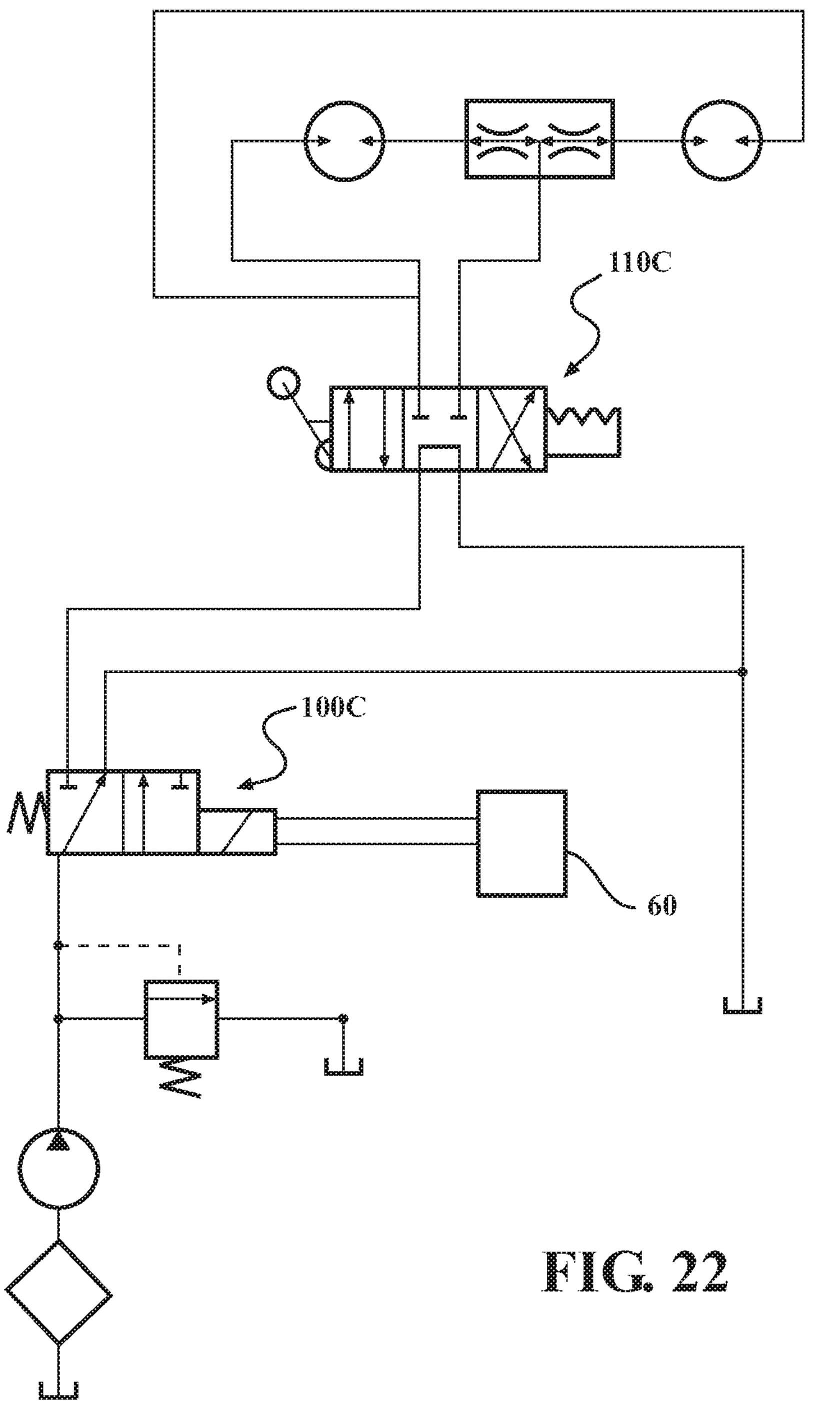
FIG. 22 is a diagrammatical view of the hydraulic system of the waste processing system according to still another embodiment of the present invention.
Figure 23:
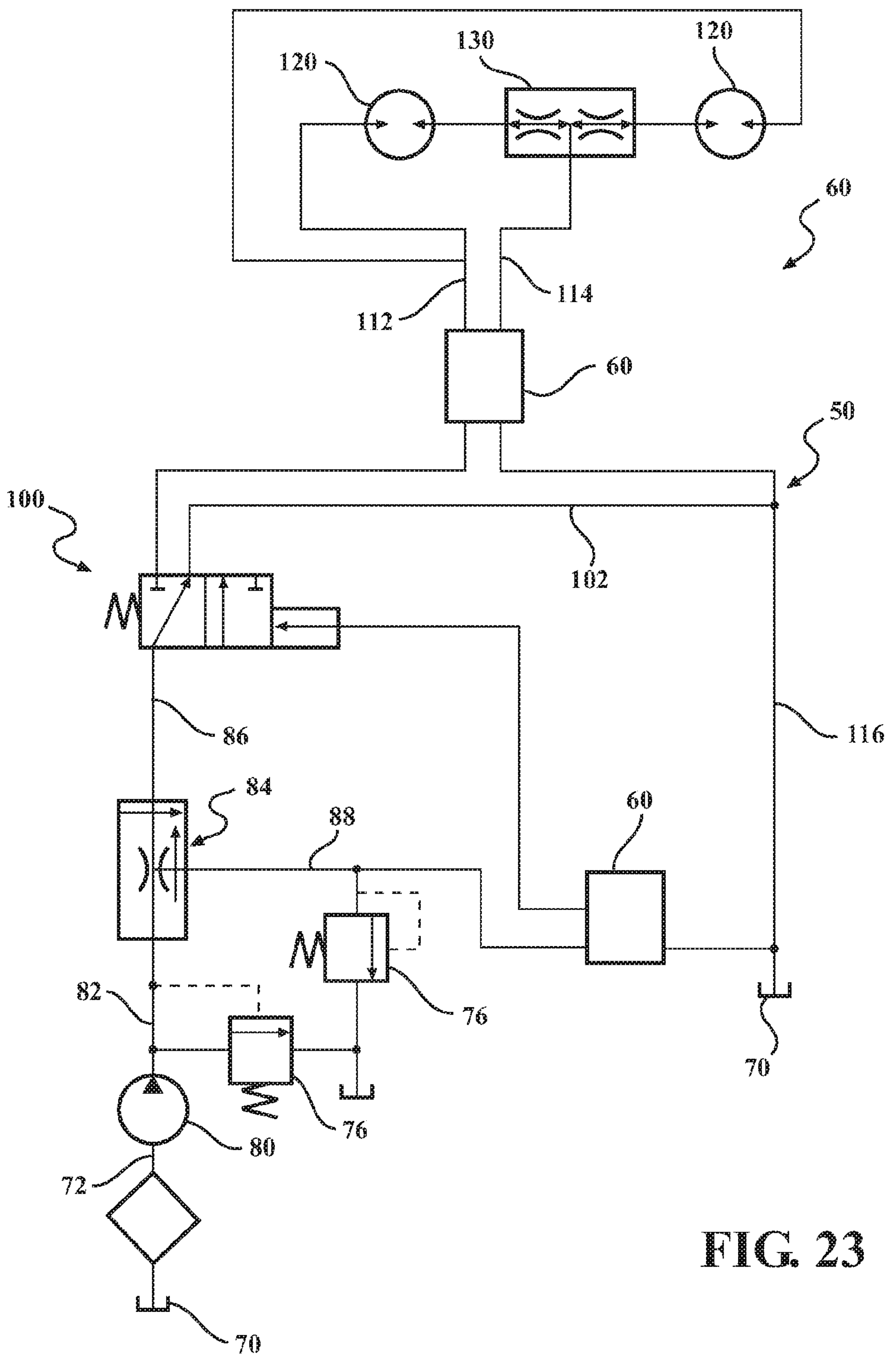
FIG. 23 is a diagrammatical view of the hydraulic system of the waste processing system according to another embodiment of the present invention.
Figure 24:
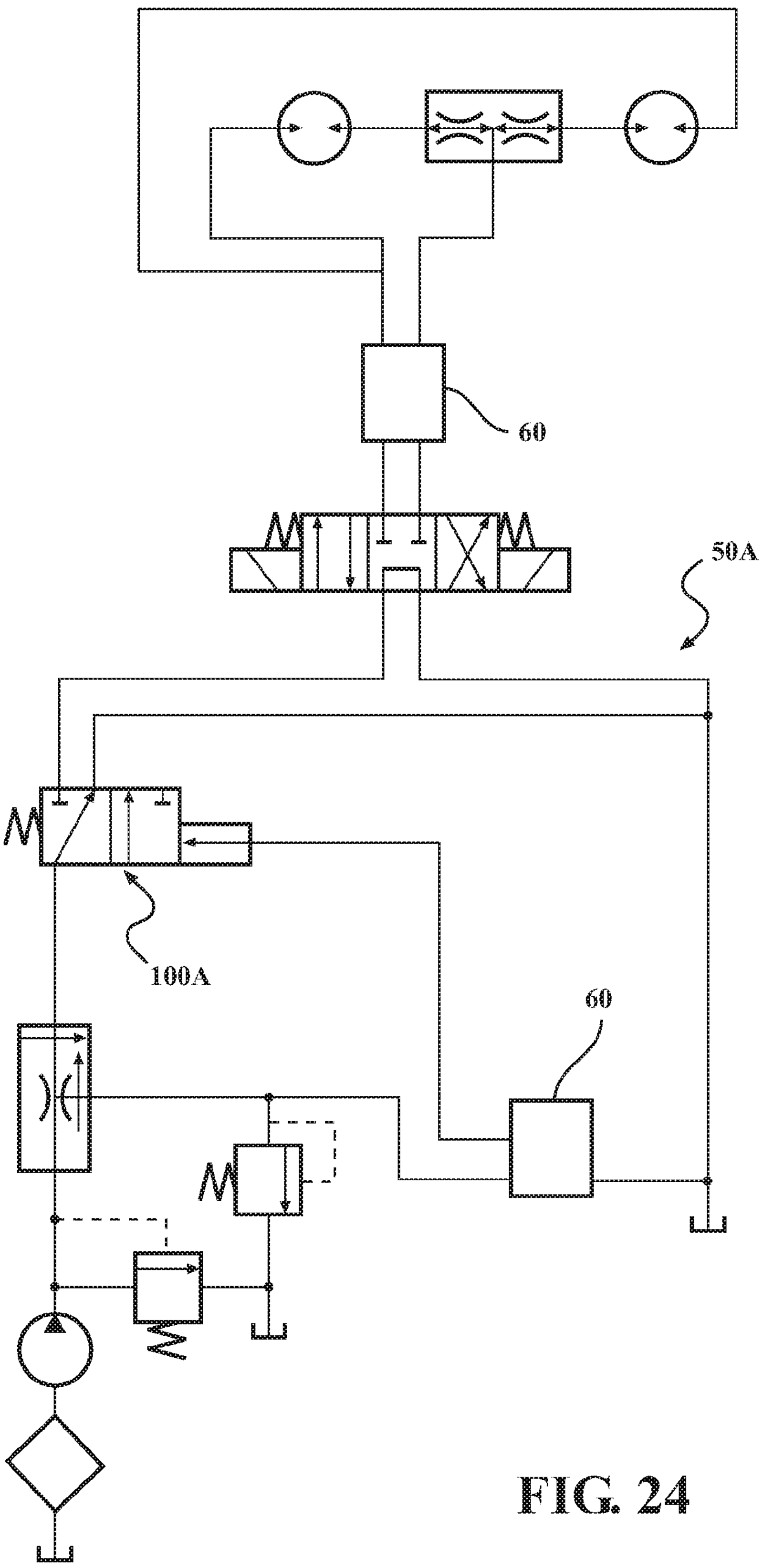
FIG. 24 is a diagrammatical view of the hydraulic system of the waste processing system according to another embodiment of the present invention.
Figure 25:
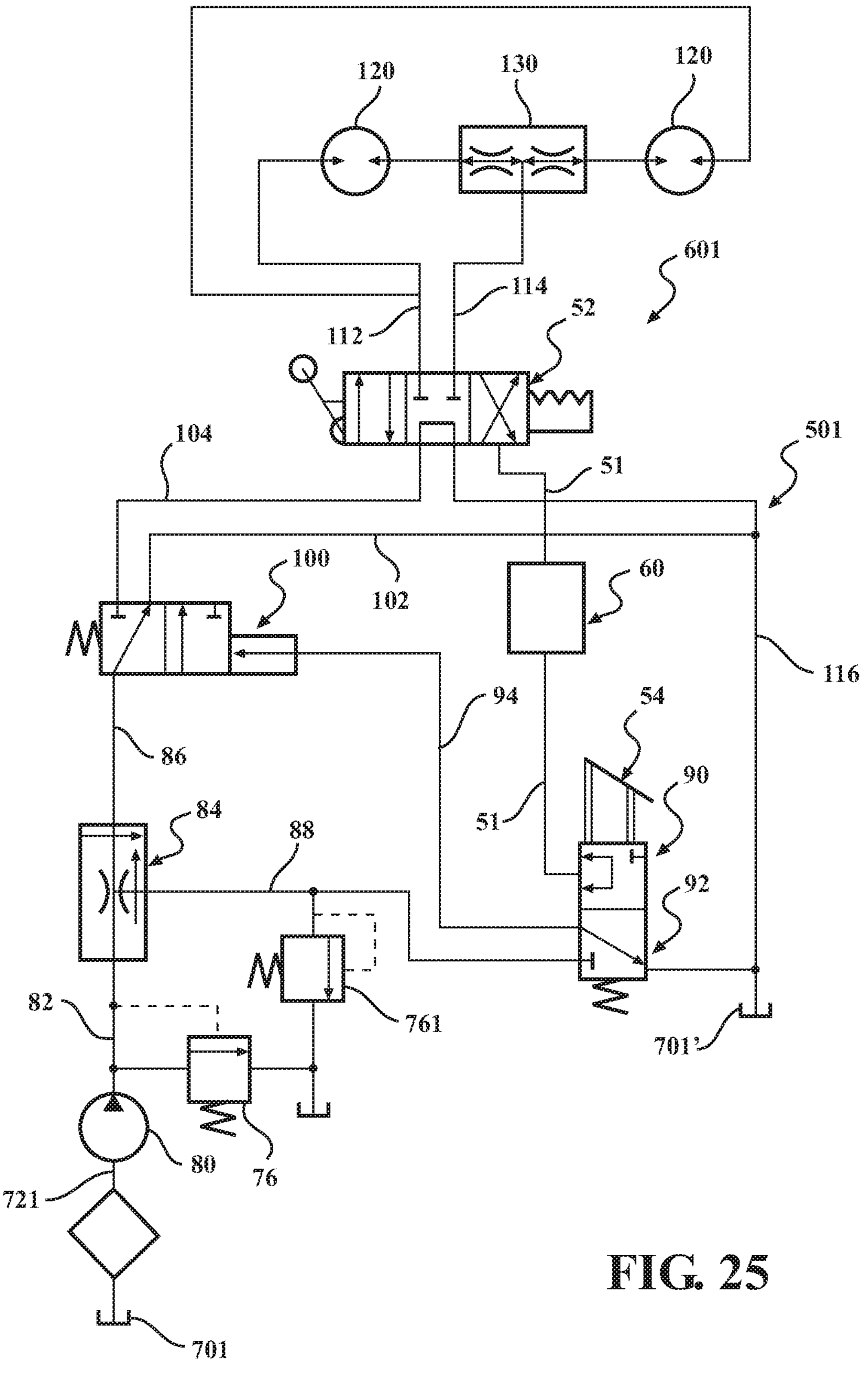
FIG. 25 is a diagrammatical view of the hydraulic system of the waste processing system according to another embodiment of the present invention.
Figure 26:
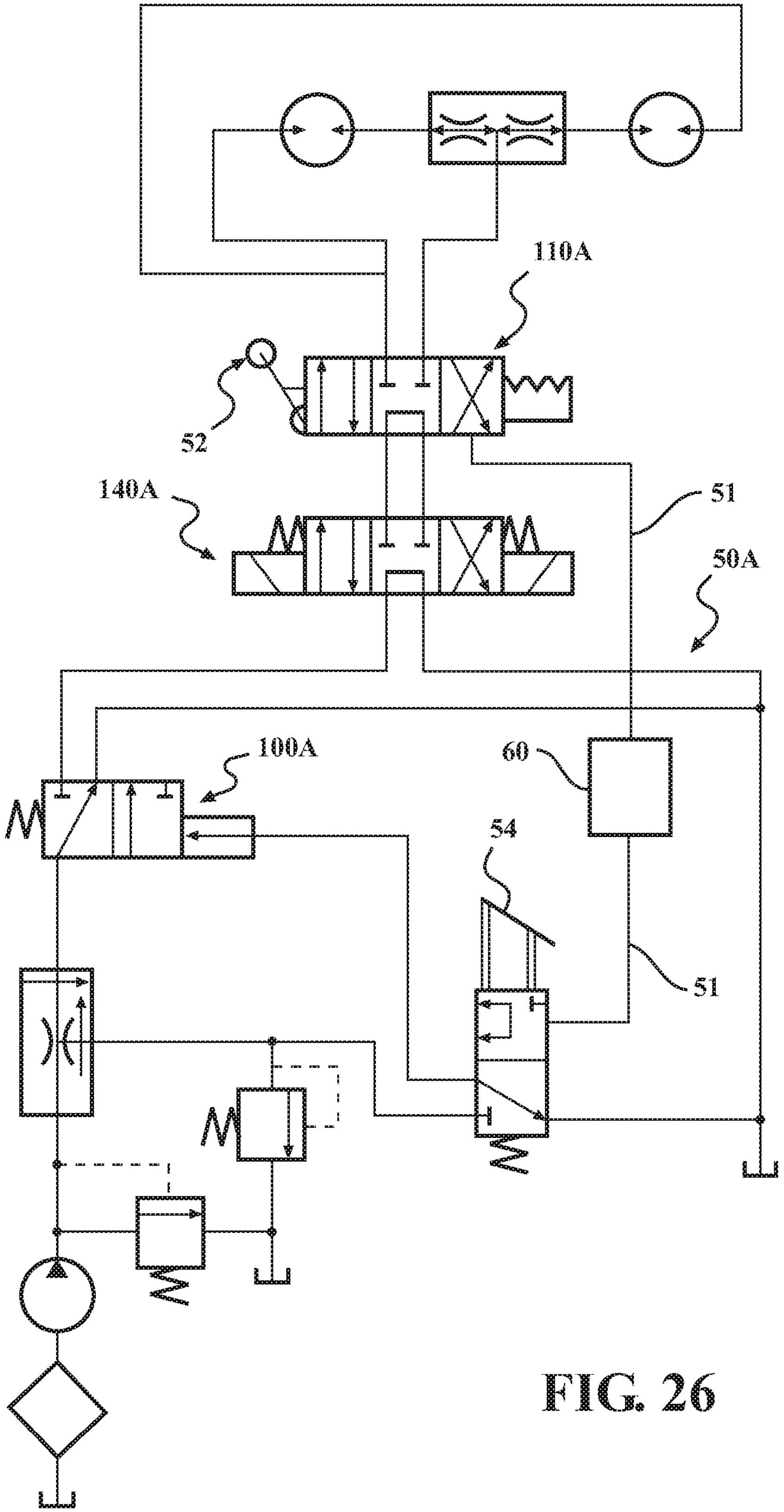
FIG. 26 is a diagrammatical view of the hydraulic system of the waste processing system according to another embodiment of the present invention.
Figure 27A:
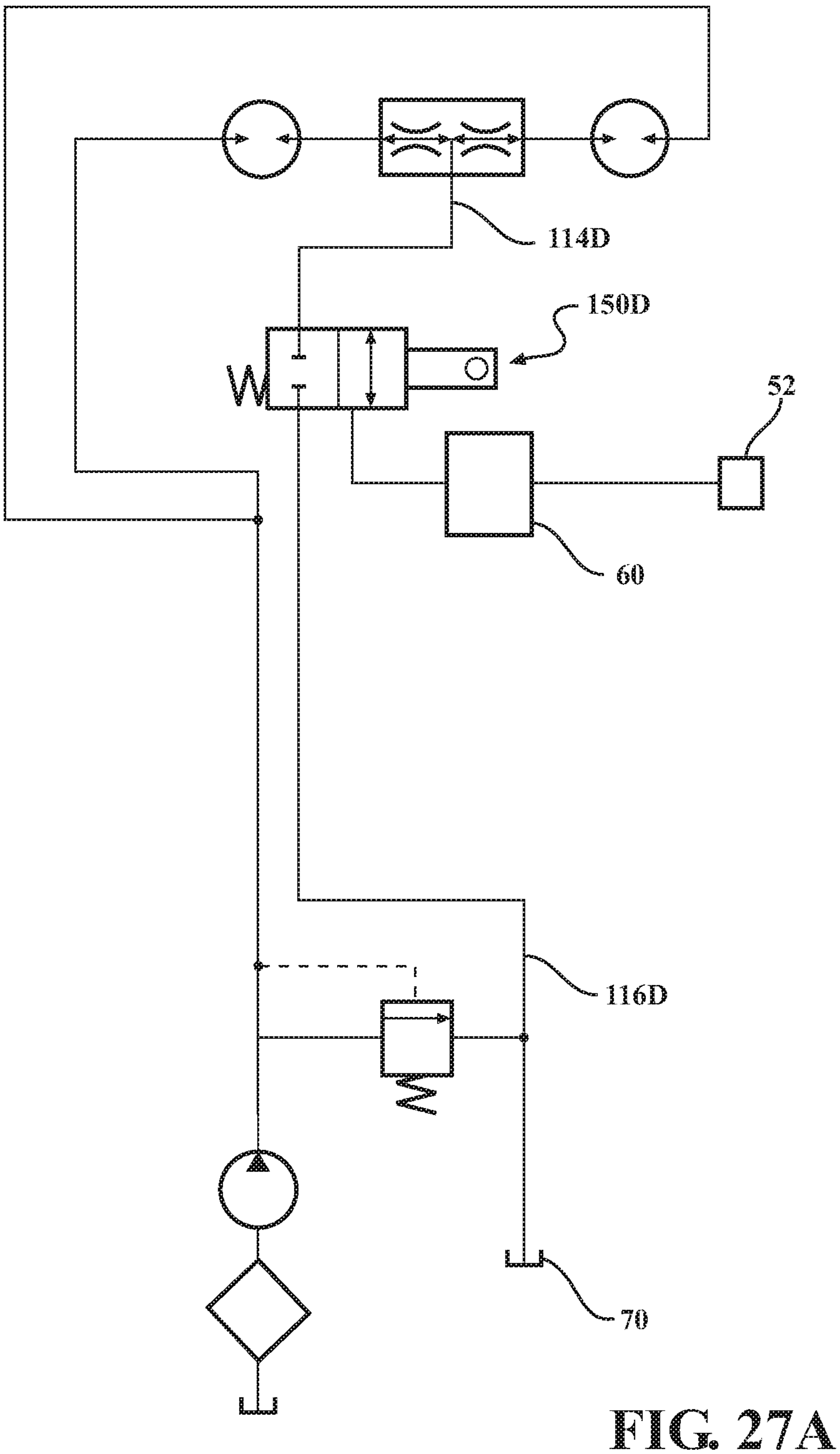
FIG. 27A is a diagrammatical view of the hydraulic system of the waste processing system according to another embodiment of the present invention.
Figure 27B:
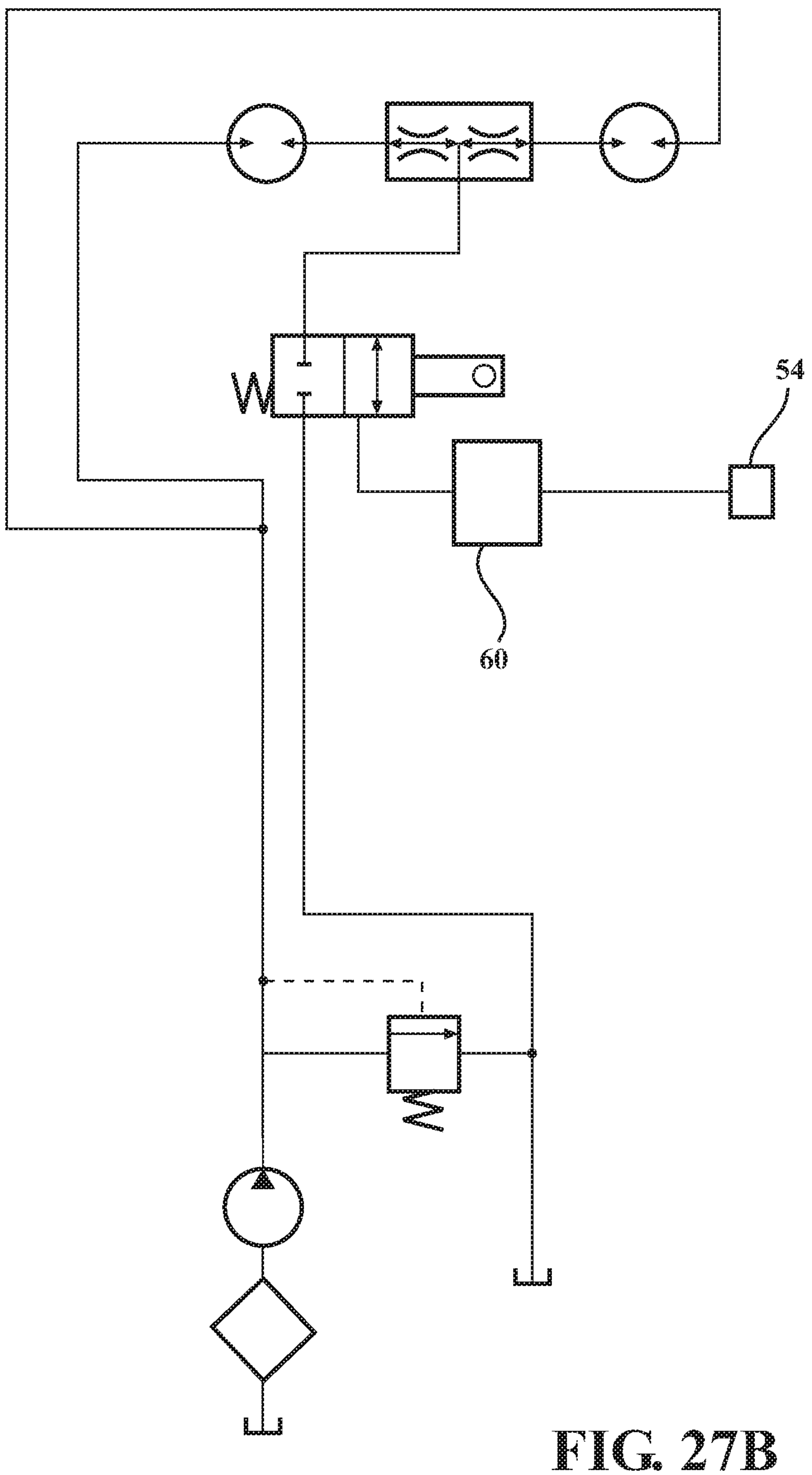
FIG. 27B is a diagrammatical view of the hydraulic system of the waste processing system according to another embodiment of the present invention.
Figure 28:
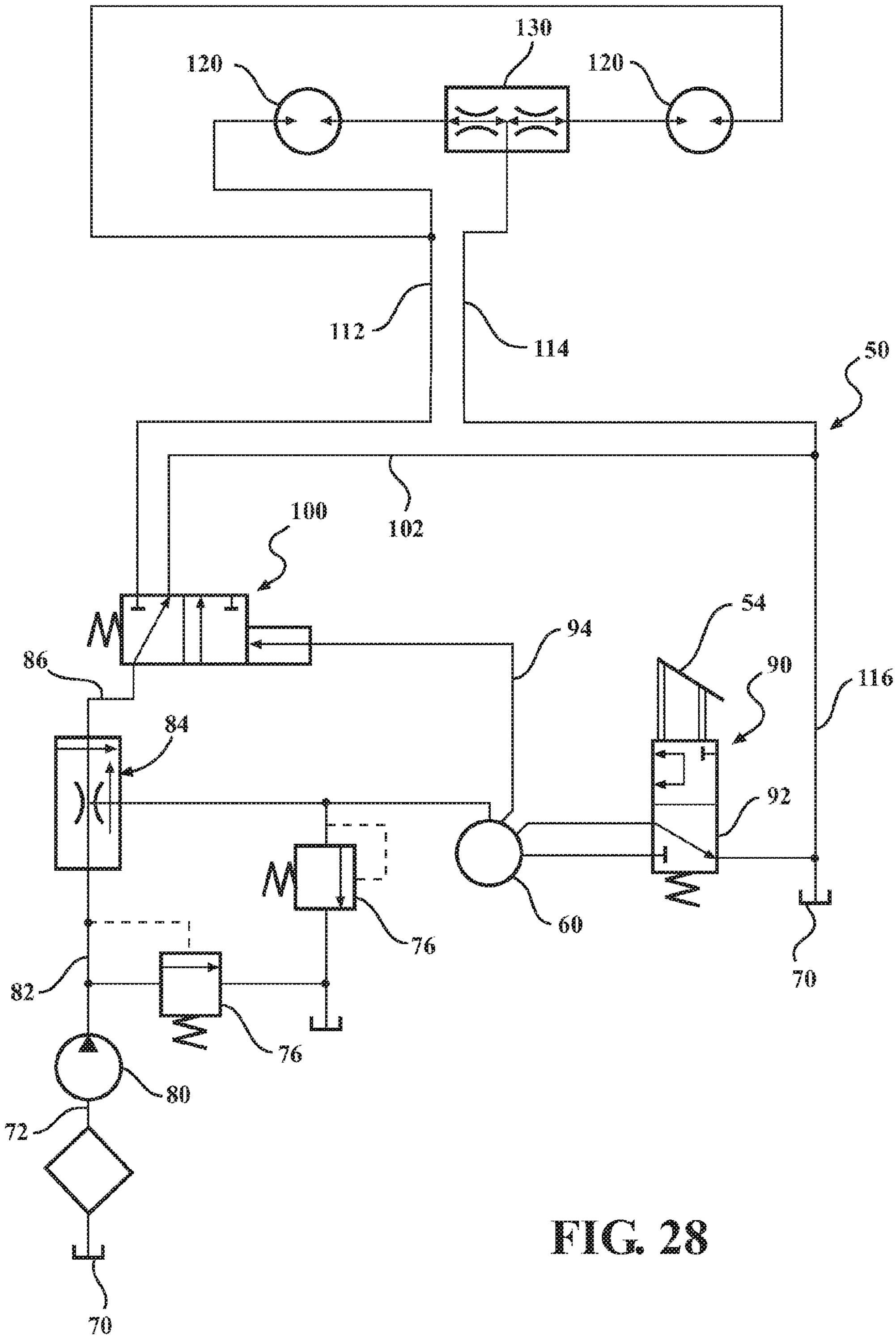
FIG. 28 is a diagrammatical view of the hydraulic system of the waste processing system according to another embodiment of the present invention.
Figure 29:
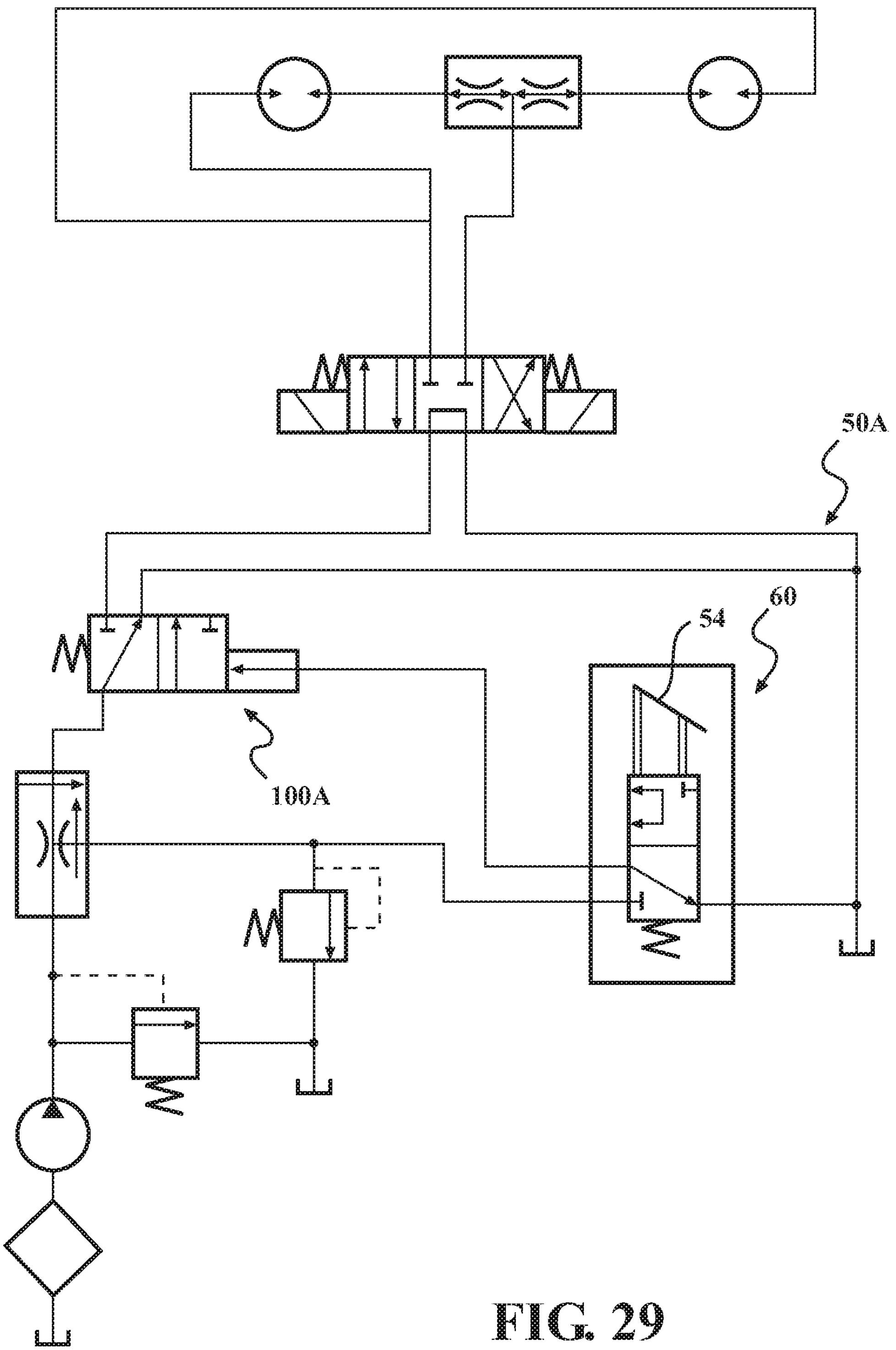
FIG. 29 is a diagrammatical view of the hydraulic system of the waste processing system according to another embodiment of the present invention.
Figure 30:
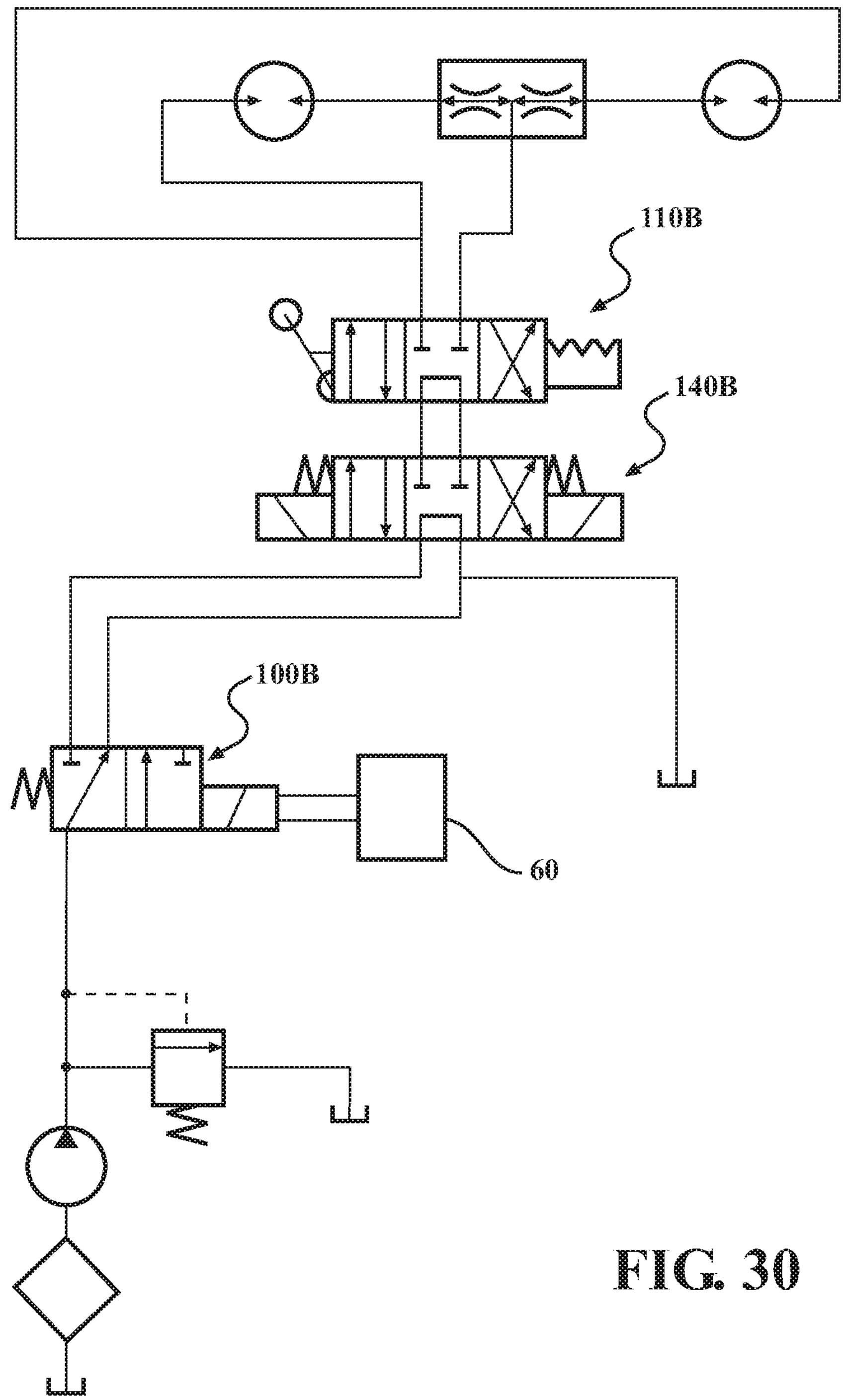
FIG. 30 is a diagrammatical view of the hydraulic system of the waste processing system according to another embodiment of the present invention.
Figure 31:
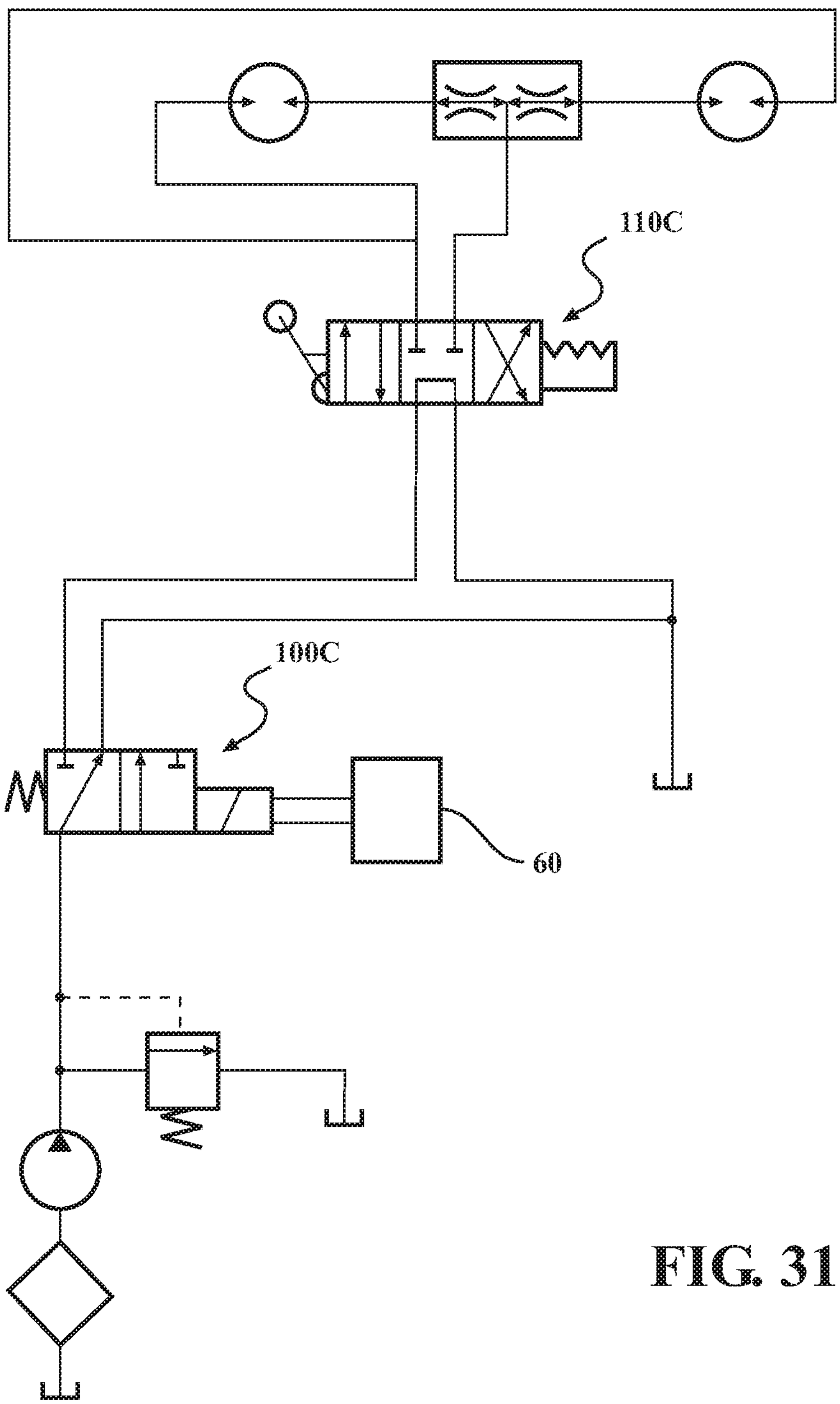
FIG. 31 is a diagrammatical view of the hydraulic system of the waste processing system according to another embodiment of the present invention.
Figure 32:
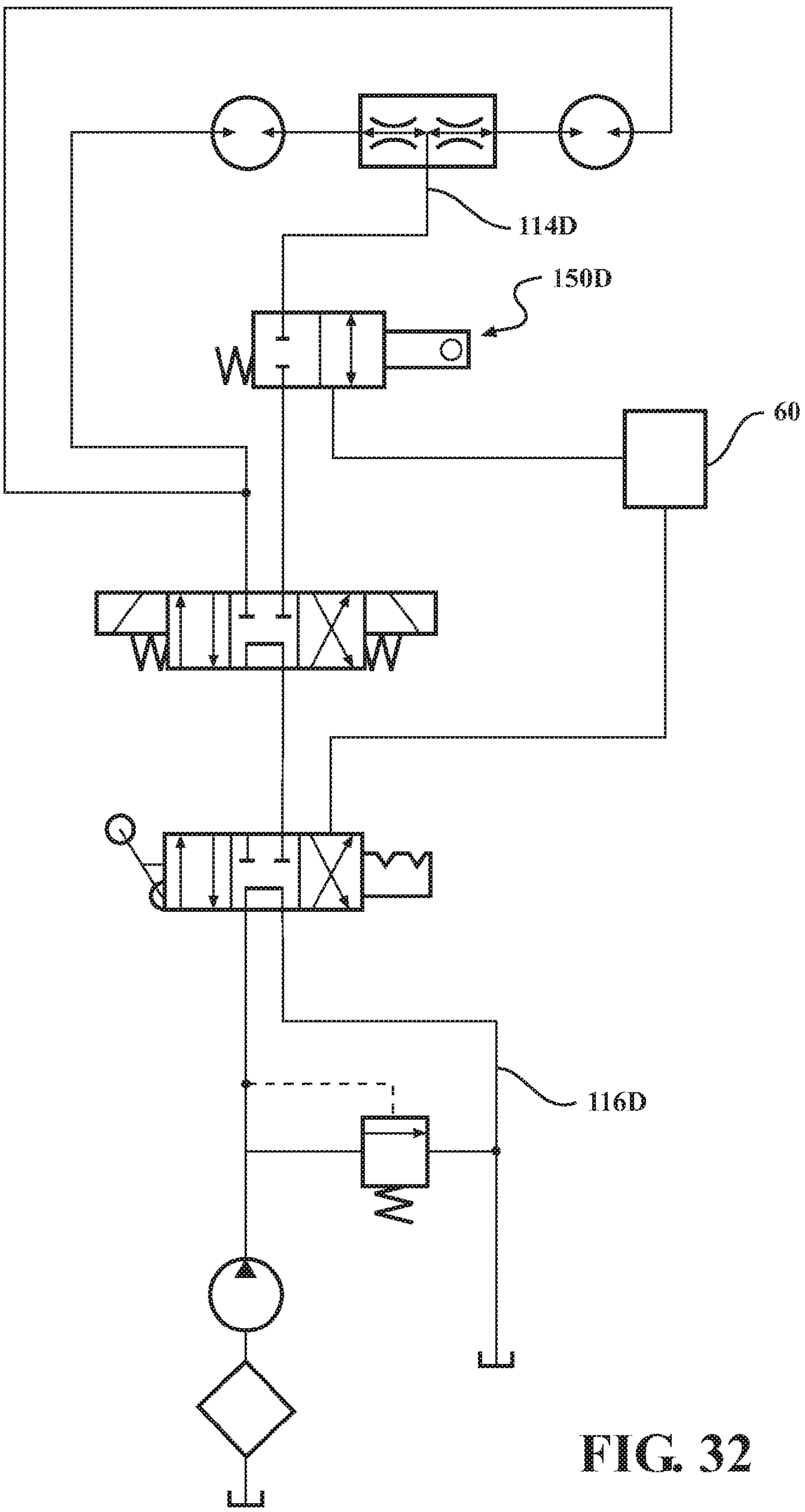
FIG. 32 is a diagrammatical view of the hydraulic system of the waste processing system according to another embodiment of the present invention.
Figure 33:
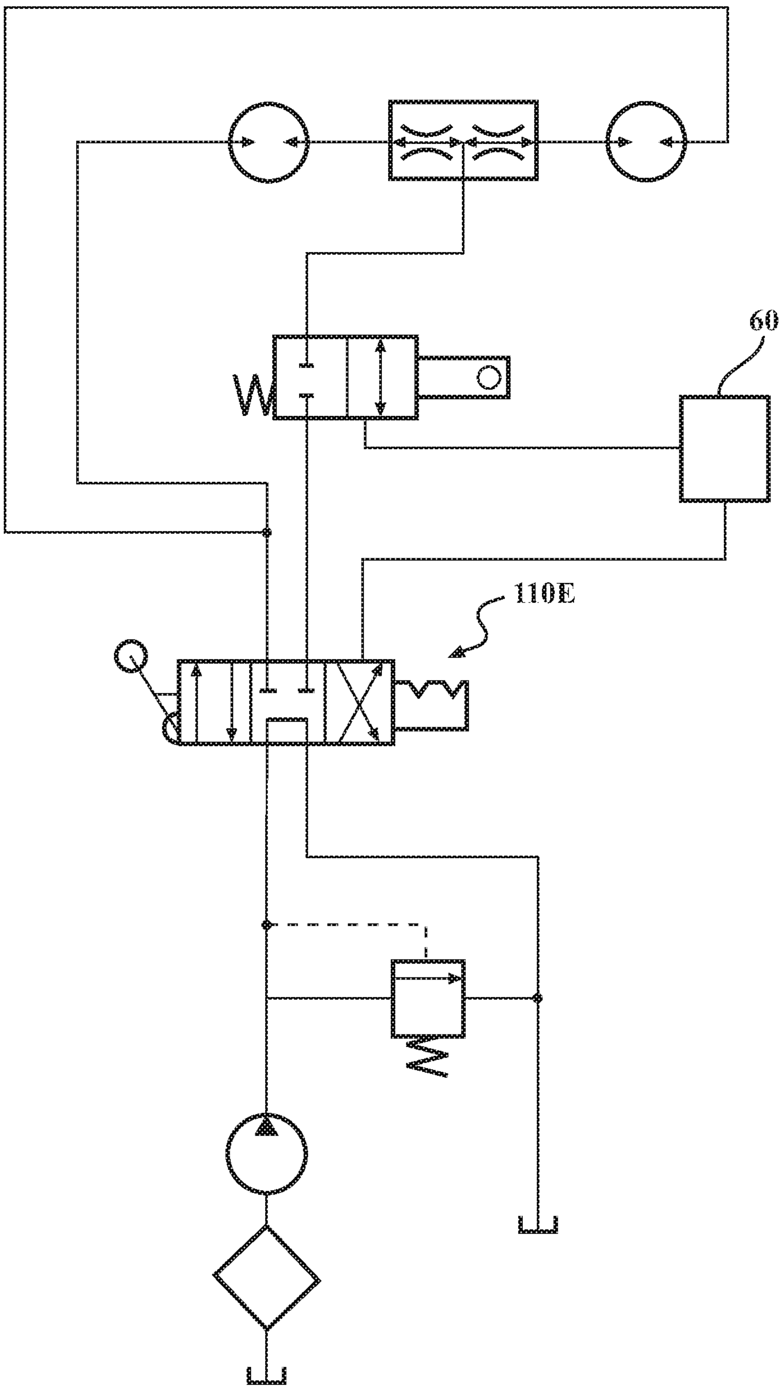
FIG. 33 is a diagrammatical view of the hydraulic system of the waste processing system according to another embodiment of the present invention.
Figure 34:
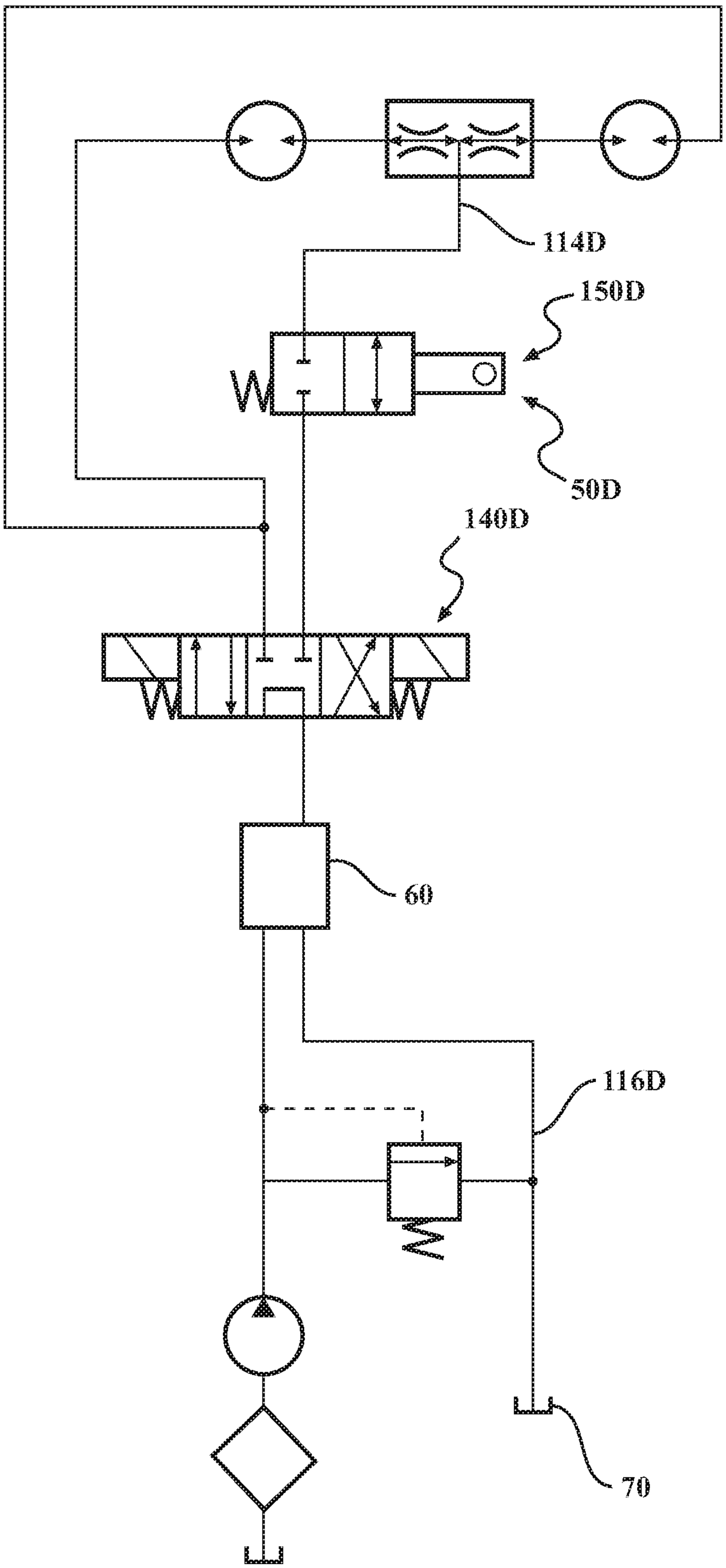
FIG. 34 is a diagrammatical view of the hydraulic system of the waste processing system according to another embodiment of the present invention.
Figure 35:
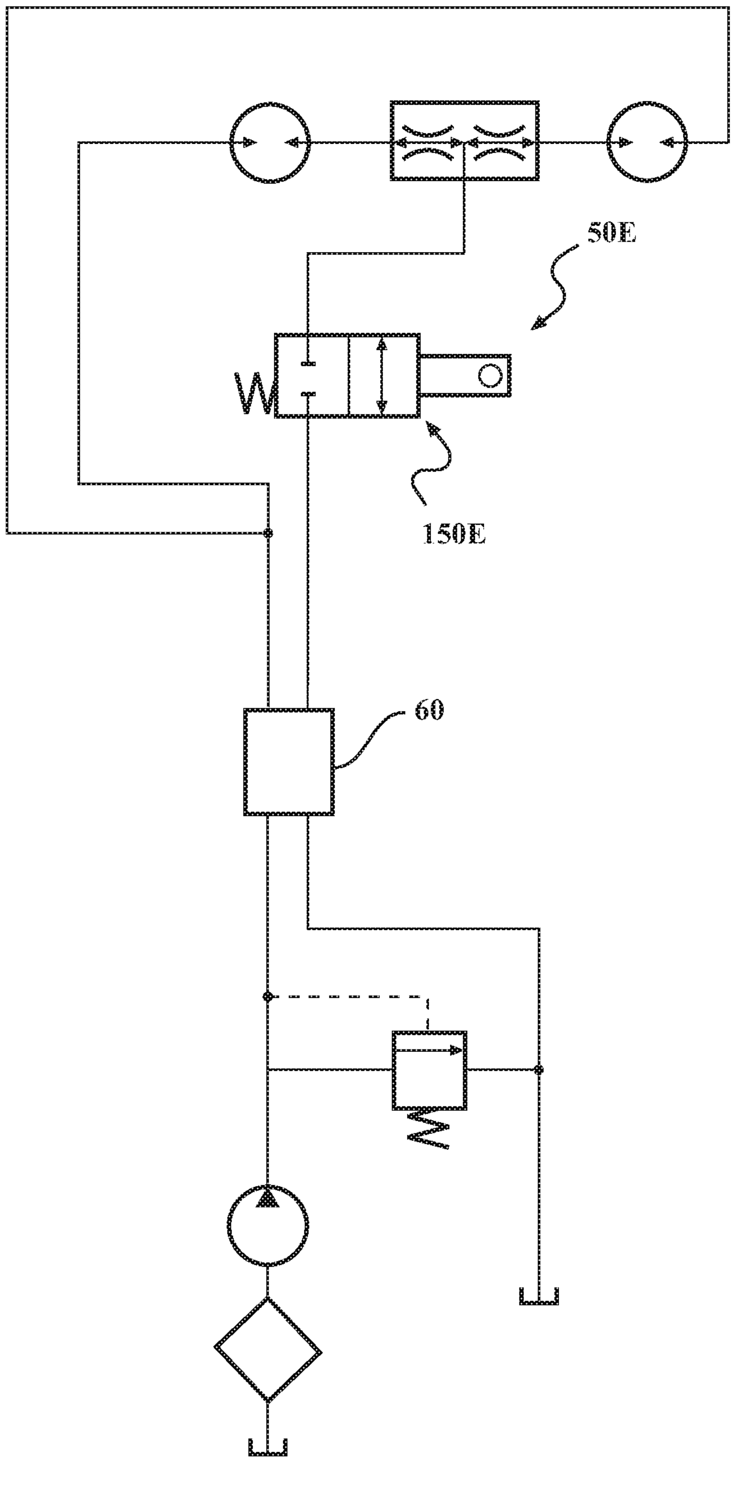
FIG. 35 is a diagrammatical view of the hydraulic system of the waste processing system according to another embodiment of the present invention.
Figure 36:
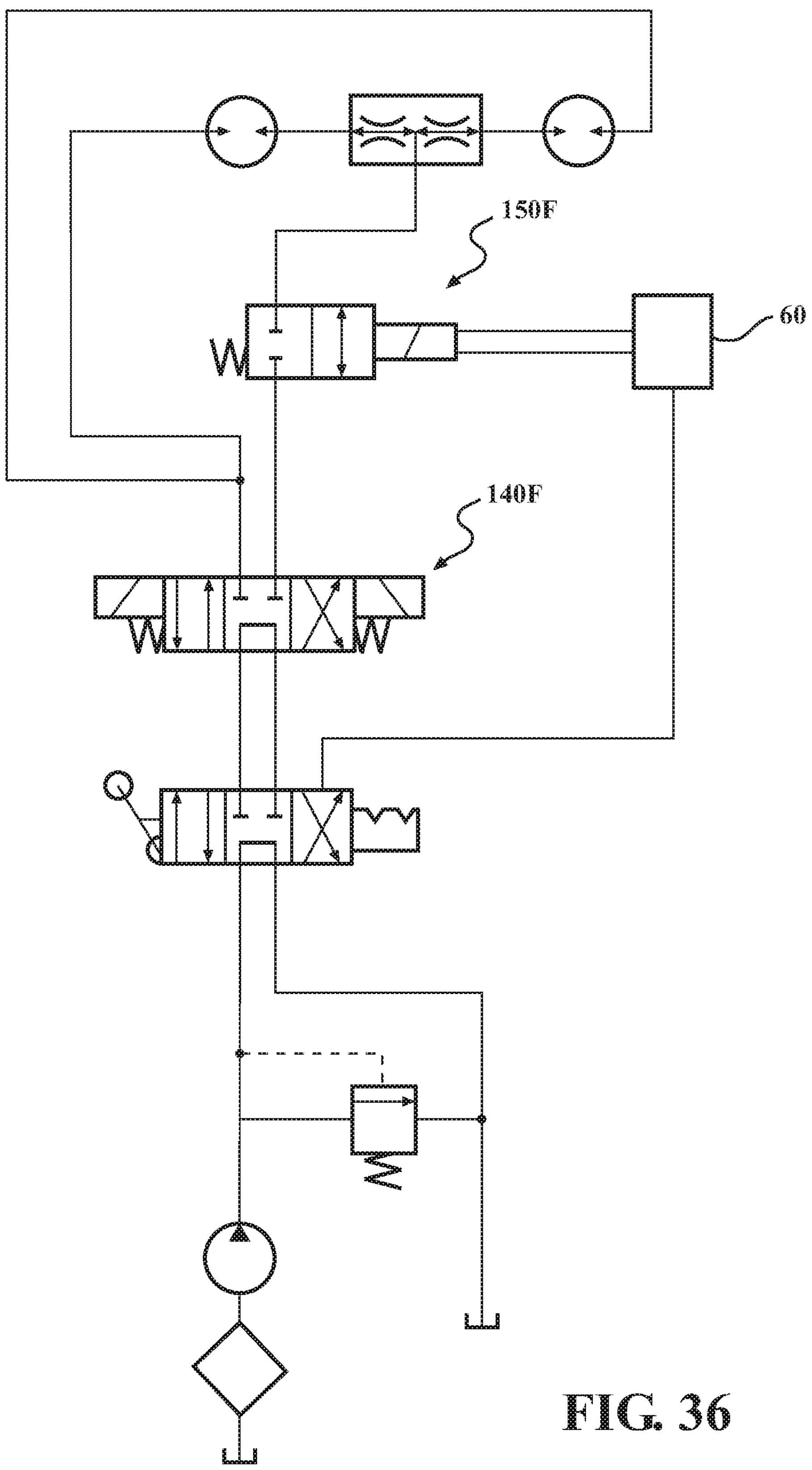
FIG. 36 is a diagrammatical view of the hydraulic system of the waste processing system according to another embodiment of the present invention.
Figure 37:
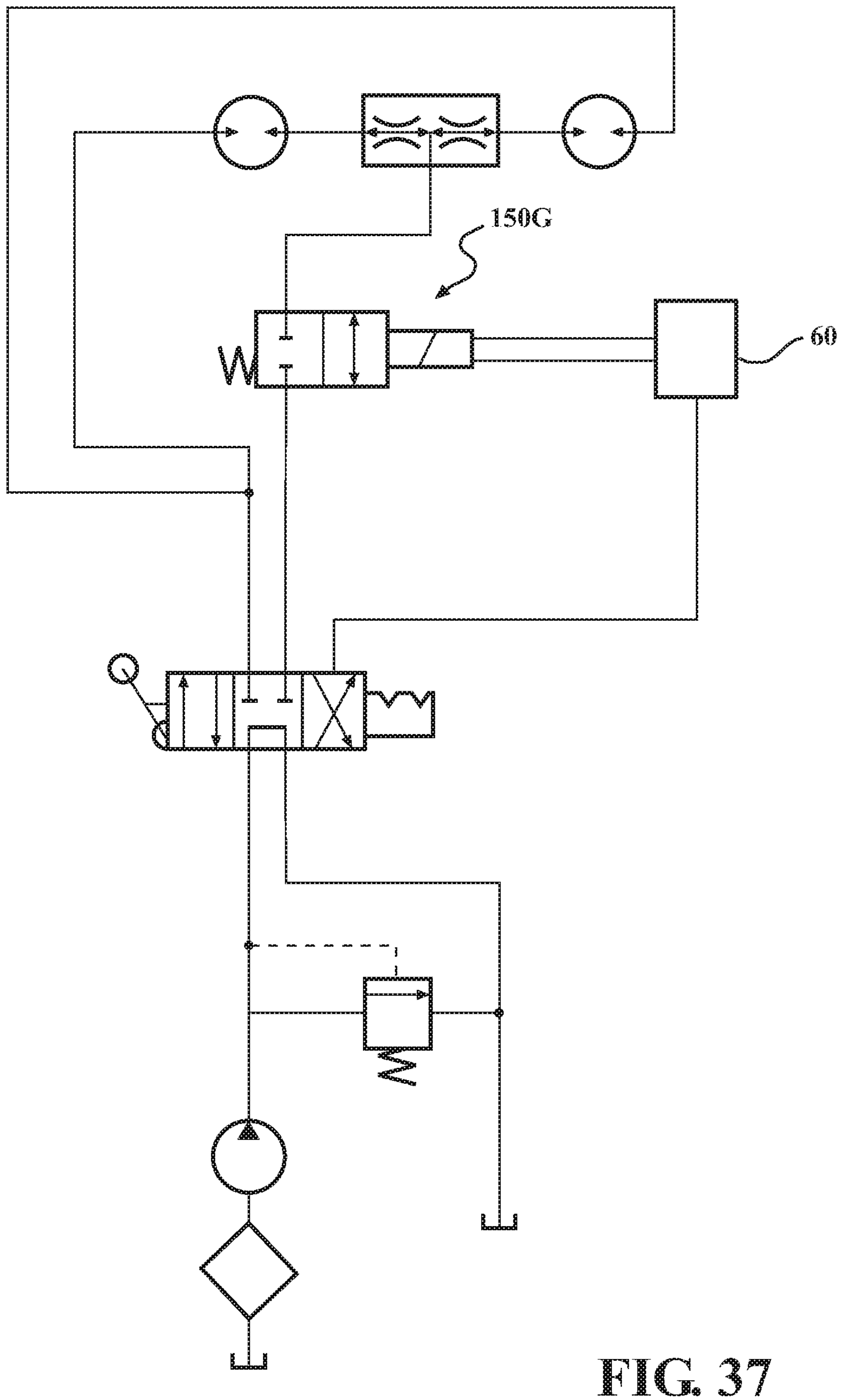
FIG. 37 is a diagrammatical view of the hydraulic system of the waste processing system according to another embodiment of the present invention.
Figure 38:
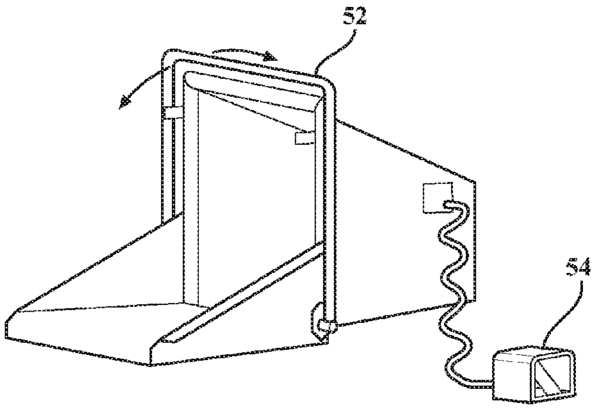
FIGS. 38-41 are partial perspective side views of a wood chipper infeed chute illustrating differing embodiments of a foot pedal according to alternate embodiments of the present invention.
Figure 39:
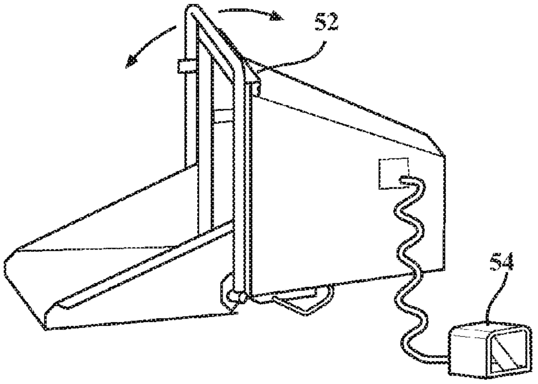
Figure 40:
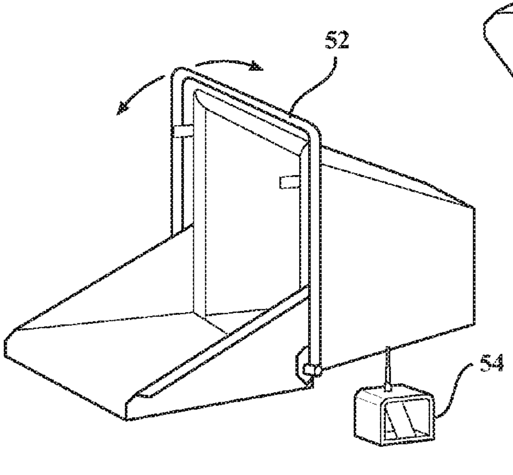
Figure 41:
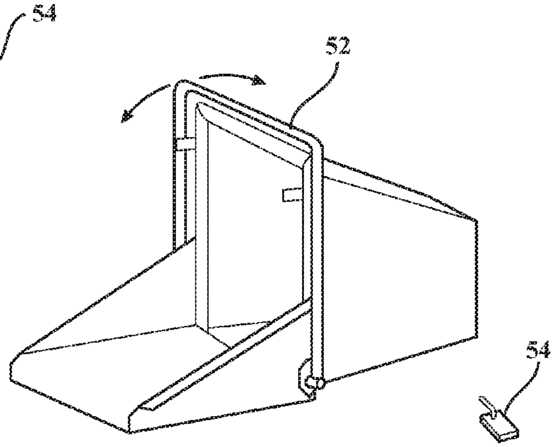

Yet further, alternate embodiments may include combinations of actuators 52 and 54 and one embodiment (FIG. 16) includes a pair of foot pedals 54. For example, control system 60 may be operably configured to require activation of a single foot pedal 54, or a pair of foot pedals 54. As such, actuators 54 could be disposed on either side of the infeed chute 20 for independent operation, dual operation by multiple operators, or positioned so as to require operation in unison.

As such, a waste processing system, vigilance control system, timer, safety system, and associated methods therefor have been developed which requires an operator to move or otherwise activate an actuator (50, 52, 54) in order to continue operation of the waste processing system 10 without interruption.

Control system 60 may be operatively connected or in communication with one or more primary systems, subsystems, or components of waste processing system 10 and more particularly, with the feed system 30, the cutting system 40, and the power system 18 in any known manner, and for example only, electrically, physically, or hydraulically. For example, a wired or electric/electronic connection 61 (FIG. 6).

Control system 60 may also be operatively connected or in communication with one or more actuators 50 of waste processing system 10 and more particularly, with the feed controls 52 and 54 in any known manner and for example only, electrically, physically, or hydraulically. For example, a wired or electric/electronic connection 51 (FIGS. 4 and 5). Control system 60 may also directly include the one or more actuators 50 (FIG. 4), include them as a subsystem (FIG. 5), or may be operatively connected to them (FIG. 7).

Further, control system 60 may control the operation of the primary systems 11 in any known manner (FIG. 6) including, electrically, physically, or hydraulically. For example, a wired or electric/electronic connection 61 as depicted in FIG. 6. Alternatively, actuators 50 may control the operation of the primary systems 11 in any known manner and for example only, electrically, physically, or hydraulically. For example, a wired or electric/electronic connection 51 and 53 as depicted in FIGS. 4, 5, and 7.

To wit, systems, devices, and methods for a waste processing system have been disclosed which increase the safety associated with the operation of, as well as the control of, a waste processing system. As such, novel systems, devices, and methods for a waste processing system have been disclosed which allows for the operation and/or control of the waste processing system via an actuator, while also providing a vigilance control system to increase operational safety.

While a linear sequence of events has been described, it should be appreciated that various modifications can be made therein and, as such, the system does not necessarily require a linear sequence of events. It is also to be understood that various modifications may be made to the system, it sequences, methods, orientations, and the like without departing from the inventive concept and that the description contained herein is merely a preferred embodiment and hence, not meant to be limiting unless stated otherwise.

Advantageously, the systems, devices, and methods for a waste processing system of the present invention include, among other advantages, the ability to provide for increased safety while being simple, useful, cost effective, and easily operable.

The solutions offered by the invention disclosed herein have thus been attained in an economical and practical manner. To wit, novel systems, devices, and methods for a waste processing system which are cost effective, easily configurable, and provide for increased operator safety and control have been invented. While preferred embodiments and example configurations of the inventions have been herein illustrated, shown, and described, it is to be appreciated that various changes, rearrangements, and modifications may be made therein, without departing from the scope of the invention as defined by the claims. It is intended that the specific embodiments and configurations disclosed herein are illustrative of the preferred and best modes for practicing the invention, and should not be interpreted as limitations on the scope of the invention as defined by the claims, and it is to appreciated that various changes, rearrangements, and modifications may be made therein, without departing from the scope of the invention as defined by the claims.

The invention claimed is:

1. A vigilance control system for a waste processing machine including a powered feed system and a powered cutting system, the control system comprising:

a manually operable actuator adapted to control at least one of the feed system and the cutting system, the actuator having at least a first and a second operable position; and a timer operatively connected to the manually operable actuator, the timer comprising a first state and a second state and adapted to alternate between the first and second states in response to a first interval and the actuator;

one of the timer and the actuator in communication with at least one of the feed system and the cutting system adapted to control the operation thereof; wherein when the actuator is in the second position, at least one of the feed system and the cutting system is deactivated; and wherein when the actuator is moved from the second position, the timer is set to the first state and will remain in the first state until the first interval expires without the actuator being moved.

2. The control system as set forth in claim 1, wherein: the timer is set to the first state until the actuator is moved.

3. The control system as set forth in claim 1, wherein: operation of at least one of the feed system and the cutting system is modified if the actuator is not manually moved between the operable positions before the first interval expires.

4. The control system as set forth in claim 1, wherein: operation of at least one of the feed system and the cutting system is modified if the actuator is not manually cycled between the operable positions before the first interval expires.

5. The control system as set forth in claim 4, wherein: the cycle between operable positions must occur within a second interval.

6. The control system as set forth in claim 4 wherein: the cycle between operable positions must occur within the first interval.

7. The control system as set forth in claim 1, wherein: when the first interval expires without the actuator being manually moved, the timer is set to the second state.

8. The control system as set forth in claim 7, wherein: at least one of the timer and the actuator deactivates at least one of the feed system, the cutting system, and the power system in response to the second state being set.

9. The control system as set forth in claim 7, wherein: at least one of the timer and the actuator reverses the feed system in response to the second state being set.

10. The control system as set forth in claim 7, wherein: the timer reverses the feed system in response to the second state being set.

11. The control system as set forth in claim 1, wherein: at least one of the timer and the actuator deactivates at least one of the feed system and the cutting system in response to the movement between at least the first and second operable positions of the actuator.

12. The control system as set forth in claim 11, wherein: at least one of the timer and the actuator reverses the feed system in response to the movement of the actuator.

13. The control system as set forth in claim 11, wherein: the timer reverses the feed system in response to the movement of the actuator.

14. The control system as set forth in claim 1, wherein: the actuator is adapted to start, stop, and reverse the feed system.

15. The control system as set forth in claim 1, wherein: the actuator is a switch.

16. The control system as set forth in claim 1, wherein: the actuator is a feed control bar.

17. The control system as set forth in claim 1, wherein: the actuator is biased to remain in the second position.

18. The control system as set forth in claim 1, wherein: the actuator is adapted to be actuated by an operator's foot.

19. The control system as set forth in claim 1, wherein: the actuator comprises a foot pedal.

20. The control system as set forth in claim 1, wherein: the actuator is a feed control bar and a foot pedal, each with at least two operable positions.

21. The control system as set forth in claim 1, wherein: the first interval comprises a preset time interval.

22. The control system as set forth in claim 1, wherein: the first interval is a user variable time interval.

23. The control system as set forth in claim 1, wherein: the actuator is in mechanical communication with the waste processing system.

24. The control system as set forth in claim 1, wherein: the timer is operatively connected to at least one of the feed system and the cutting system and deactivates at least one of the feed system and the cutting system in response to the second state being set.

25. The control system as set forth in claim 1, wherein: the timer is operatively connected to the feed system and deactivates the feed system in response to the second state being set.

26. The control system as set forth in claim 1, wherein: the timer is operatively connected to the feed system and reverses the feed system in response to the second state being set.

27. The control system as set forth in claim 1, wherein: the timer is electronic.

28. The control system as set forth in claim 1, wherein: the first interval comprises a preset time.

29. The control system as set forth in claim 1, wherein: the first interval comprises a user settable time.

30. The control system as set forth in claim 1, further comprising:

a warning indicator to indicate to an operator, before the first interval passes, that the first interval may expire.

31. A vigilance control system for a waste processing machine including a feed system, a cutting system, and a power system adapted to power the feed system and the cutting system, and a manually operable actuator having at least two operable positions and adapted to control at least one of the feed system, the cutting system, and the power system, the vigilance control system comprising:

a timer for monitoring a time period, the timer comprising a first state and a second state, operably connected to at least one of the feed system and the cutting system and operably connected to the actuator to sense movement thereof, wherein in response to the expiration of the time period or the sensed movement of the actuator, the timer is adapted to selectively control at least one of the feed system and the cutting system; wherein when the actuator is in a predetermined position the feed system is disabled; and wherein when the actuator is moved from the predetermined position the timer is set to the first state and remains in the first state until the time period expires without the actuator being manually moved.

32. The control system as set forth in claim 31, wherein:

the selective control includes deactivating the feed system in response to the expiration of the time period without sensed movement of the actuator.

33. The control system as set forth in claim 31, wherein:

when the time period expires without the actuator being manually moved, the timer is set to the second state.

34. The control system as set forth in claim 31, wherein:

the first state is maintained subject to the actuator being moved to the second position and when moved to the second position, the timer is set to the second state.

35. A timer for a waste processing machine including a feed system, a cutting system, and a power system adapted to power the feed system and the cutting system, and a manually operable actuator having at least two operable positions and adapted to control at least one of the feed system, the cutting system, and the power system, the timer comprising:

a first state and a second state, the timer adapted to switch between the first and second states in response to at least one of a time period having expired and an actuator being moved between the at least two operable positions;

the timer operably connected to at least one of the feed system and the cutting system;

whereby operation of at least one of the feed system and the cutting system is modified if the actuator is moved to a first position, the timer is set to the first state and remains in the first state until the time period expires, and the actuator is not manually moved between the operable positions of the actuator before the time period expires.

36. The timer as set forth in claim 35, wherein:

the timer is adapted to modify operation of the feed system by deactivating the feed system if the actuator is not manually moved before the time period expires.

37. A waste processing machine comprising:

a frame;

an infeed assembly operatively attached to the frame;

a rotatable cutting assembly spaced from said infeed assembly and operatively attached to the frame;

at least one feed wheel operatively attached to the frame disposed between said infeed assembly and said cutting assembly to feed wood material to said cutting assembly;

a manually operable actuator adapted to control at least one of the feed system and the cutting system, the actuator having at least two operable positions; and a control operatively connected to the actuator and adapted to sense positional movement of the actuator;

the control further including a timer, wherein the control is adapted to determine if positional movement of the actuator has occurred within a preset time frame and wherein the timer further comprises a first state and a second state;

at least one of the control, timer, and the actuator in communication with at least one of the feed system and the cutting system, and adapted to control the operation thereof;

whereby operation of at least one of the feed system and the cutting system is modified if the actuator is moved to a first position, the timer is set to the first state and remains in the first state until the preset time frame expires, and the control does not sense positional movement of the actuator during the preset time frame.

38. A waste processing machine comprising:

a frame;

an infeed assembly operatively attached to the frame;

a rotatable cutting assembly spaced from said infeed assembly and operatively attached to the frame;

at least one feed wheel operatively attached to the frame disposed between said infeed assembly and said cutting assembly to feed wood material to said cutting assembly;

a manually operable actuator adapted to start and stop the feed system, the actuator having at least a first and a second position; and a timer operatively connected to the manually operable actuator and adapted to sense at least the first position of the actuator, the timer comprising a first state and a second state and adapted to determine if the first position of the actuator has been engaged for a preset time frame;

the timer in communication with the feed system and adapted to stop operation of the feed system if the timer is set to the first state and remains in the first state until the preset time frame expires, and the first position has been engaged for more the preset time frame.

39. The waste processing machine as set forth in claim 38, wherein:

the timer is further adapted to sense a second position of the actuator, the timer adapted to stop operation of the feed system if the first or the second position has been engaged during the preset time frame.

40. The waste processing machine system as set forth in claim 38, wherein:

the actuator is a feed control bar.

41. The waste processing machine system as set forth in claim 38, wherein:

the actuator comprises a foot pedal.

42. The waste processing machine system as set forth in claim 38, wherein:

the timer is electronic.

43. A method of operating a waste processing system including a feed system, a cutting system, and a power system adapted to power the feed system and the cutting system, at least one manually operable actuator having at least two operable positions and adapted to control at least one of the feed system and the cutting system, and a timer comprising a first state and a second state, operatively connected to the manually operable actuator and adapted to sense if positional movement of the actuator has occurred within a first time frame, the method comprising:

sensing positional movement of the actuator;

prohibiting operation of at least one of the feed system and the cutting system in response to the actuator being in a first position;

allowing operation of at least one of the feed system and the cutting system in response to the actuator being out of the first position;

initializing the timer to track a first time frame in response to the actuator being out of the first position; and changing operation of at least one of the feed system and the cutting system in response to the timer being set to the first state and remaining in the first state until the time frame expires, and the expiration of the time frame without positional movement of the actuator being sensed.

44. The method as set forth in claim 43, wherein:

the sensing step comprises sensing at least a second position of the actuator.

45. The method as set forth in claim 43, wherein:

the prohibiting step comprises prohibiting operation of at least one of the feed system and the cutting system in response to the actuator being in a second position.

46. The method as set forth in claim 43, wherein:

the allowing step comprises allowing operation of at least one of the feed system and the cutting system in response to the actuator being out of a second position.

47. The method as set forth in claim 43, wherein:

the initializing step comprises initializing the timer to track the time frame in response to the actuator being out of a second position.

48. The method as set forth in claim 43, wherein:

the changing step comprises changing operation of at least one of the feed system and the cutting system in response to positional movement of the actuator being sensed.

49. The method as set forth in claim 43, wherein:

the changing step comprises changing operation of at least one of the feed system and the cutting system in response to at least one of the time frame and positional movement of the actuator being sensed.

50. The method as set forth in claim 43, wherein:

the changing step comprises changing operation of at least one of the feed system and the cutting system in response to at least one of the expiration of the time frame and positional movement of the actuator being sensed during the time frame.

51. The method as set forth in claim 43, wherein:

the changing step comprises prohibiting operation of the feed system in response to positional movement of the actuator not being sensed during the time frame.

52. The method as set forth in claim 43, wherein:

the changing step comprises allowing operation of the feed system in response to positional movement of the actuator being sensed during the time frame.

53. The method as set forth in claim 43, wherein:

the changing step comprises prohibiting operation of at least one of the feed system and the cutting system in response to the expiration of the time frame without positional movement of the actuator being sensed, and allowing operation of at least one of the feed system and the cutting system in response to positional movement of the actuator being sensed during the time frame.

54. The method of operating a waste processing system comprising:

providing a waste processing machine including a feed system, a cutting system, and a power system adapted to power the feed system and the cutting system, at least one manually operable actuator having at least two operable positions and adapted to control at least one of the feed system and the cutting system, and a timer comprising a first state and a second state, operatively connected to the manually operable actuator and adapted to sense if positional movement of the actuator has occurred within a time frame;

sensing positional movement of the actuator including a predetermined position;

prohibiting operation of the feed system in response to the actuator being sensed in the predetermined position;

allowing operation of the feed system in response to the actuator being out of the predetermined position;

setting the timer to track a first time frame in response to the actuator being out of the predetermined position;

changing operation of the feed system including prohibiting operation of the feed system in response to the timer being set to the first state and remaining in the first state until the time frame expires, and an expiration of the time frame without positional movement of the actuator being sensed, and allowing operation of the feed system in response to positional movement of the actuator being sensed during the time frame; and re-setting the timer to track the time frame in response to positional movement of the actuator being sensed during the time frame.

55. A control for a waste processing system comprising a cutting system and a feed system, wherein the control comprises:

a pedal operatively connected to an actuator, the pedal having at least two operable positions;

wherein the actuator is adapted to selectively control the feed system in response to the at least two operable positions of the pedal;

wherein two operable positions of the pedal correspond to selective control of the feed system in a forward direction and a reverse direction;

wherein the pedal is positionable about the waste processing system; and a timer operatively connected to the pedal, the timer comprising a first state and a second state and adapted to alternate between the first and second states in response to a time interval and the pedal;

one of the timer and the pedal in communication with at least one of the feed system and the cutting system and adapted to control the operation thereof, wherein when the pedal is in a predetermined position, at least one of the feed system and the cutting system is deactivated, and when the pedal is moved from the predetermined position, the timer is set to the first state and remains in the first state until the time interval expires without the pedal being moved.

56. The control as set forth in claim 55, wherein:

the pedal comprises at least three operable positions.

57. A vigilance control system for a waste processing machine including a feed system, a cutting system, and a power system adapted to power the feed system and the cutting system, and a manually operable actuator having at least two operable positions and adapted to control at least one of the feed system, the cutting system, and the power system, the vigilance control system comprising:

a timer for monitoring a first time period and operatively connected to the manually operable actuator, the timer comprising a first state and a second state and adapted to alternate between the first and second states in response to a time period and the actuator; and a positional sensor for sensing the position of the actuator;

the actuator operably connected to the feed system and adapted to selectively control the feed system in response to the timer, wherein when the actuator is in a predetermined position, at least one of the feed system and the cutting system is deactivated, and when the actuator is moved from the predetermined position, the timer is set to the first state and remains in the first state until the time period expires without the actuator being moved.

* * * * *